(12) United States Patent  
Gao et al.

(10) Patent No.: US 11,740,535 B2  
(45) Date of Patent: Aug. 29, 2023

(54) DISPLAY APPARATUS AND CONTROLLING METHOD THEREOF

(71) Applicant: BOE TECHNOLOGY GROUP CO., LTD., Beijing (CN)

(72) Inventors: Jian Gao, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 428 days.

(21) Appl. No.: 16/484,223

(22) PCT Filed: Jan. 10, 2019

(86) PCT No.: PCT/CN2019/071172  
§ 371 (c)(1),  
(2) Date: Aug. 7, 2019

(87) PCT Pub. No.: WO2020/037941  
PCT Pub. Date: Feb. 27, 2020

(65) Prior Publication Data  
US 2021/0325763 A1  Oct. 21, 2021

(30) Foreign Application Priority Data  
Aug. 20, 2018  (CN) .......................... 201810946216.5

(51) Int. Cl.  
*G02F 1/29* (2006.01)  
*F21V 8/00* (2006.01)  
(Continued)

(52) U.S. Cl.  
CPC ........... *G02F 1/294* (2021.01); *G02B 6/0016* (2013.01); *G02B 6/0038* (2013.01);  
(Continued)

(58) Field of Classification Search  
CPC .. G02B 27/4272; G02B 6/0036; G02B 6/002; G02B 5/18; G02B 6/0016;  
(Continued)

(56) References Cited

U.S. PATENT DOCUMENTS 7,738,344 B2 * 6/2010 Ooi ....................... G11B 7/1374  
369/112.02  
2005/0046945 A1   3/2005 Hwang  
(Continued)

FOREIGN PATENT DOCUMENTS

CN  1577092 A   2/2005  
CN  107479248 A  12/2017  
(Continued)

OTHER PUBLICATIONS

International Search Report dated May 20, 2019, issued in counterpart Application No. PCT/CN2019/071172 (12 pages).  
(Continued)

*Primary Examiner* — Hoan C Nguyen  
(74) *Attorney, Agent, or Firm* — WHDA, LLP

(57) ABSTRACT

The present disclosure relates to a multifocal lens. The multifocal lens may include N liquid crystal panels in a stacked manner. The N liquid crystal panels may include an n-th liquid crystal panel, and the n-th liquid crystal panel may include an n-th converging element having an n-th focal length. N is a positive integer greater than or equal to 2, n is a positive integer, and $1 \leq n \leq N$. The n-th liquid crystal panel may be configured to be switchable between a converging state and a non-converging state. The N liquid crystal panels may be configured to make the multifocal lens to have switchable $C_N^1 + C_N^2 + C_N^3 + \ldots + C_N^N$ focal lengths, and the $C_N^1 + C_N^2 + C_N^3 + \ldots + C_N^N$ focal lengths are all different from one another.

17 Claims, 26 Drawing Sheets

(51) Int. Cl.
    *G02B 27/01*    (2006.01)
    *G02B 27/28*    (2006.01)
(52) U.S. Cl.
    CPC ........ *G02B 27/0101* (2013.01); *G02B 27/285* (2013.01); *G02F 2201/305* (2013.01)
(58) Field of Classification Search
    CPC ............. G02B 27/0101; G02B 6/0038; G02B 6/0018; G02B 3/10; G02B 27/0172; G02B 27/285; G02F 1/294; G02F 1/19; G02F 1/13471; G02F 1/29; G02F 2201/305; G02F 1/133776
    See application file for complete search history.

(56) References Cited

U.S. PATENT DOCUMENTS

| | | | | |
|---|---|---|---|---|
| 2006/0152812 | A1* | 7/2006 | Woodgate | H04N 13/305 359/619 |
| 2008/0055536 | A1* | 3/2008 | Shimozono | G02F 1/133526 349/200 |
| 2011/0109824 | A1* | 5/2011 | Galstian | C09K 19/02 252/570 |
| 2014/0267961 | A1* | 9/2014 | Jeong | G02B 5/1842 349/15 |
| 2015/0168756 | A1* | 6/2015 | Cho | G02F 1/1343 349/33 |
| 2016/0212415 | A1* | 7/2016 | Cho | H04N 13/315 |
| 2017/0131568 | A1* | 5/2017 | Haddock | G02C 7/083 |
| 2017/0168372 | A1* | 6/2017 | Ito | G02C 7/083 |
| 2018/0074457 | A1 | 3/2018 | Jolly et al. | |
| 2018/0231867 | A1* | 8/2018 | Gao | G02F 1/134309 |
| 2018/0341128 | A1* | 11/2018 | Ito | G02F 1/1343 |
| 2019/0094650 | A1 | 3/2019 | Gao et al. | |

FOREIGN PATENT DOCUMENTS

| | | | |
|---|---|---|---|
| CN | 108037598 A | | 5/2018 |
| CN | 108398791 A | | 8/2018 |
| CN | 109031678 A | | 12/2018 |
| CN | 109669278 A | | 4/2019 |
| JP | 2005215122 A | * | 8/2005 |
| JP | 2010181645 A | * | 8/2010 |

OTHER PUBLICATIONS

Office Action dated Feb. 6, 2020, issued in counterpart CN application No. 201810946216.5, with English translation. (22 pages).

* cited by examiner

DISPLAY APPARATUS AND CONTROLLING METHOD THEREOF

CROSS-REFERENCE TO RELATED APPLICATIONS

This application claims benefit of the filing date of Chinese Patent Application No. 201810946216.5 filed on Aug. 20, 2018, the disclosure of which is hereby incorporated in its entirety by reference.

TECHNICAL FIELD

The present disclosure relates to the field of display technologies, and in particular, to a display apparatus and a method for controlling the display apparatus.

BACKGROUND

Modern computing technology and display technology have facilitated the development of systems for so-called "virtual reality" or "augmented reality" experience in which digitally rendered images or portions thereof are rendered in a manner that appears to be real or perceptible to be true. To the user. Virtual reality or "VR" scenes typically involve presentation of digital or virtual image information without displaying actual real world. In contrast, augmented reality or "AR" scenes typically involve presentation of digital or virtual image information as visual enhancement of the real world around the user. Currently, VR and AR have been developed as technologies that can be implemented at low cost by inexpensive apparatus such as mobile phones. In particular, the development of high-resolution micro-displays and modern graphic processing units (GPUs) has contributed to realization of very realistic experience.

BRIEF SUMMARY

An embodiment of the present disclosure provides a multifocal lens. The multifocal lens may include N liquid crystal panels in a stacked manner. The N liquid crystal panels may include an n-th liquid crystal panel, and the n-th liquid crystal panel may include an n-th converging element having an n-th focal length. N is a positive integer greater than or equal to 2, n is a positive integer, and $1 \leq n \leq N$. The n-th liquid crystal panel may be configured to be switchable between a converging state and a non-converging state. The N liquid crystal panels may be configured to make the multifocal lens to have switchable $C_N^1 + C_N^2 + C_N^3 + \ldots + C_N^N$ focal lengths, and the $C_N^1 + C_N^2 + C_N^3 + \ldots + C_N^N$ focal lengths are all different from one another.

Optionally, the n-th liquid crystal panel comprises a n-th first base substrate, a n-th second base substrate facing to the n-th first base substrate, a n-th first transparent electrode between the n-th first base substrate and the n-th second base substrate, a n-th second transparent electrode between the n-th first base substrate and the n-th second base substrate, a n-th liquid crystal layer between the n-th first base substrate and the n-th second base substrate, and a n-th converging element between the n-th first base substrate and the n-th second base substrate.

Optionally, the n-th liquid crystal panel further comprises an alignment film between the n-th first base substrate and the n-th second base substrate, and alignment film being next to the n-th liquid crystal layer and configured to control orientation of liquid crystals in the n-th liquid crystal layer.

Optionally, the n-th converging element comprises an annular phase diffraction grating.

Optionally, the n-th liquid crystal panel further comprises a n-th third transparent electrode between the n-th first base substrate and the n-th second base substrate, and the n-th third transparent electrode and the n-th second transparent electrode are on a side of the n-th liquid crystal layer opposite from the n-th converging element, and the n-th third transparent electrode is insulated from the n-th second transparent electrode.

Another example of the present disclosure is a display apparatus. The display apparatus may include a display panel and the multifocal lens according to one embodiment of the present disclosure on a light exiting side of the display panel.

Optionally, the display apparatus further comprises a light guiding structure, which is configured to guide light emerging from the multifocal lens towards a user's eyes.

Optionally, the light guiding structure comprises an in-coupling grating, a light guide plate, and an out-coupling grating. The in-coupling grating is configured to couple the light emerging from the multi-focal lens to the light guide plate, and the out-coupling grating is configured to couple the light out of the light guide plate.

Optionally, the in-coupling grating and the multifocal lens are located at one end of the light guide plate, the light guide plate is between the in-coupling grating and the multifocal lens, the out-coupling grating is on the other end of the light guide plate and at a same side of the light guiding plate as the in-coupling grating.

Optionally, grating constant d of the out-coupling grating satisfies $$d = \frac{2\lambda}{n' + 1}$$

wherein n' is a refractive index of the light guide plate, and λ is a wavelength of an incident light.

Optionally, the light guiding structure comprises a first polarization beam splitting prism and a second polarization beam splitting prism. The first polarization beam splitting prism is configured to reflect the light emerging from the multifocal lens to the second polarization beam splitting prism, and the second polarization beam splitting prism is configured to reflect the light from the first polarization beam splitting prism to the user's eyes.

Optionally, the display apparatus further comprises a polarizer on a side of the multifocal lens facing the display panel.

Optionally, a direction of a transmission axis of the polarizer is parallel to polarization directions of the reflected light by the first polarization beam splitting prism and the second polarization beam splitting prism respectively.

Optionally, light emitting from the display panel is a polarized light having a polarization direction parallel to a transmission axis of the polarizer.

Optionally, liquid crystals in the n-th liquid crystal layer of the n-th liquid crystal panel have an initial alignment direction parallel to the transmission axis of the polarizer.

Optionally, the n-th liquid crystal layer of the n-th liquid crystal panel liquid crystal panels is configured to be switchable from one of a first refractive index and a second refractive index to the other based on a voltage applied to the n-th first transparent electrode and the n-th second transparent electrode, the first refractive index is smaller than a refractive index of the n-th converging element of then-th liquid crystal panel liquid crystal panel, and the second refractive index is equal to the refractive index of the n-th converging element of then n-th liquid crystal panel.

Optionally, the display apparatus further comprises a control unit, wherein the control unit is configured to generate a voltage difference between a first transparent electrode and a second transparent electrode in one or more of the N liquid crystal panels, thereby switching the multifocal lens to have switchable $C_N^1 + C_N^2 + C_N^3 + \ldots + C_N^N$ focal lengths.

Optionally, N is 2.

Another example of the present disclosure is a display apparatus. The display apparatus may include a display panel and the multifocal lens according to one embodiment of the present disclosure on a light exiting side of the display panel.

Optionally, The display apparatus further comprises a control unit, wherein the control unit is configured to generate a voltage difference among a first transparent electrode, a second transparent electrode, and/or a third transparent electrode in one or more of the N liquid crystal panels, thereby switching the multifocal lens to have switchable $C_N^1 + C_N^2 + C_N^3 + \ldots + C_N^N$ focal lengths.

BRIEF DESCRIPTION OF THE DRAWINGS

The drawings described herein are for purposes of illustration only, and are not intended to include all the possible embodiments and limit the scope of the present disclosure.

DETAILED DESCRIPTION

Figure 1:
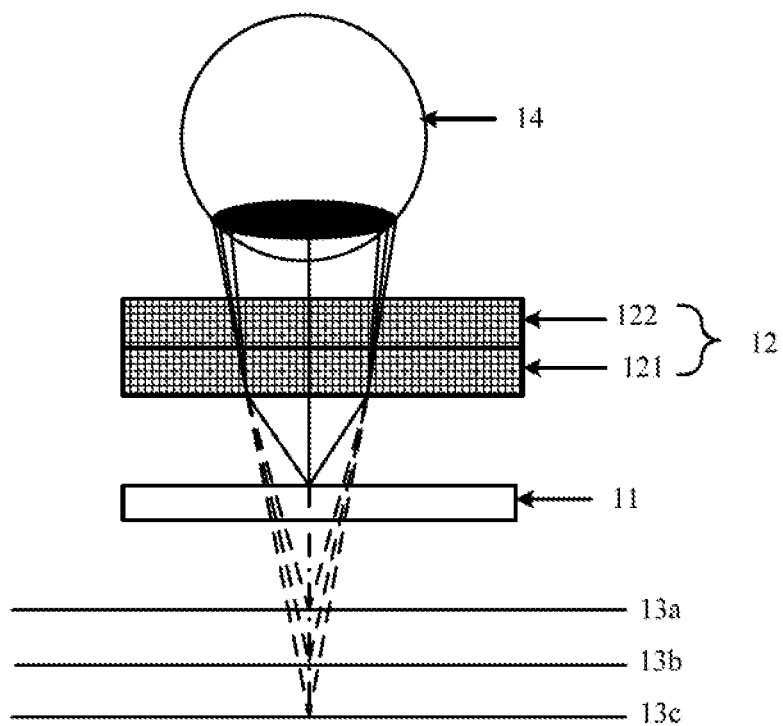
FIG. 1 shows a schematic diagram of a display apparatus according to some embodiments of the disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-20. When referring to the figures, like structures and elements shown throughout are indicated with like reference numerals.

It is to be noted that the following figures and examples are not intended to limit the scope of the disclosure. Where specific components of the disclosure may be implemented in part or in whole using known components (or methods or processes), only those portions of the known components (or methods or processes) required for understanding the disclosure will be described. Detailed descriptions of other parts of such known components will be omitted so as not to obscure the present disclosure. Further, various embodiments include, by way of illustration, current and future known components equivalent to the components involved herein.

In addition, it should also be noted that when introducing elements of this application and its embodiments, the articles "a", "an," "the" and "said" are intended to indicate the existence of one or more elements. Unless otherwise specified, the meaning of "multiple" is two or more. The terms "comprising," "including," "having," and "containing" are meant to be inclusive and are meant that there may be additional elements in addition to the listed elements. The terms "first," "second," "third" and the like are for the purpose of description only and are not to be understood as indicating or implying relative importance and order of formation.

For the purpose of the surface description below, as used in the drawings, the terms "upper," "lower," "left," "right," "vertical," "horizontal," "top," "bottom" and its derivatives should refer to disclosures. The terms "over,", "above," "positioned on" or "positioned on top of" mean that a first element, such as a first structure, exists above a second element, such as a second structure. Wherein an intermediate element such as an intermediate structure may exist between the first element and the second element. The term "direct contact" means connecting a first element such as a first structure and a second element such as a second structure without any intermediate conductive, insulating or semiconducting layers at the interface of the two elements.

In virtual reality (VR) or augmented reality (AR) display technology, a magnifying glass is provided in front of a display panel as an image source to form an enlarged virtual image viewed by a user. As an example of the AR display apparatus, the AR display apparatus may include a display panel, an imaging lens (as a magnifying glass), and a light guiding structure. The display panel is located within a focal length of the imaging lens such that the imaging lens forms an enlarged virtual image of the object displayed by the display panel. The light guiding structure can introduce both imaging light and ambient light from the display panel into the human eye to form an AR display. The VR display apparatus is similar to the AR display apparatus in that the display panel is placed within the focal length of the imaging lens to form a virtual image of the object, except that the VR display apparatus is opaque to ambient light.

However, imaging lenses used in AR or VR display apparatus generally have a fixed focal length, thereby allowing imaging in only one depth space. Accordingly, multiple depth spatial imaging cannot be achieved. Therefore, there is a need for a display apparatus capable of achieving multiple depth spatial imaging.

One example of the present disclosure is a multifocal lens. The multifocal lens includes N liquid crystal panels in a stacked manner. The N liquid crystal panels comprise a n-th liquid crystal panel, and the n-th liquid crystal panel comprises a n-th converging element having a n-th focal length. N is a positive integer greater than or equal to 2, and n is a positive integer, and 1≤n≤N. The n-th liquid crystal panel may be configured to be switchable between a converging state and a non-converging state. The N liquid crystal panels are configured to make the multifocal lens to have switchable $C_N^1+C_N^2+C_N^3+\ldots+C_N^N$ focal lengths, and the $C_N^1+C_N^2+C_N^3+\ldots+C_N^N$ focal lengths are all different from one another. In one embodiment, the n-th liquid crystal panel comprises a n-th first base substrate, a n-th second base substrate facing to the n-th first base substrate, a n-th first transparent electrode between the n-th first base substrate and the n-th second base substrate; a n-th second transparent electrode between the n-th first base substrate and the n-th second base substrate; a n-th liquid crystal layer between the n-th first base substrate and the n-th second base substrate; and a n-th converging element between the n-th first base substrate and the n-th second base substrate. The n-th converging element may comprise an annular phase diffraction grating.

In one embodiment, the n-th liquid crystal panel further comprises an alignment film between the n-th first base substrate and the n-th second base substrate, and the alignment film being next to the n-th liquid crystal layer and configured to control orientation of liquid crystals in the n-th liquid crystal layer.

In one embodiment, the n-th liquid crystal panel further comprises a n-th third transparent electrode between the n-th first base substrate and the n-th second base substrate, and the n-th third transparent electrode and the n-th second transparent electrode are on a side of the n-th liquid crystal layer opposite from the n-th converging element, and the n-th third transparent electrode is insulated from the n-th second transparent electrode.

FIG. 1 shows a schematic diagram of a display apparatus according to some embodiments of the present disclosure. As shown in FIG. 1, the display apparatus may include a display panel 11 and a multifocal lens 12 wherein N=2 at the light exiting side of the display panel 11. The multifocal lens 12 may include a first liquid crystal panel 121 and a second liquid crystal panel 122 which are disposed in a stacked manner. Each liquid crystal panel is switchable from one of a converging state and a non-converging state to the other.

"Converging state" of a liquid crystal panel herein means that the liquid crystal layer has a smaller refractive index than that of the converging element in the liquid crystal panel. "Non-converging state" of a liquid crystal panel herein means that the liquid crystal layer has a same refractive index as that of the converging element in the liquid crystal panel.

As an example, in the case where the first liquid crystal panel 121 is in the converging state and the second liquid crystal panel 122 is in the non-converging state, the multifocal lens may have the first focal length of the first liquid crystal panel 121. In the case where the first liquid crystal panel 121 is in the non-converging state, and the second liquid crystal panel 122 is in the converging state, the multifocal lens may have the second focal length of the second liquid crystal panel 122. In the case where the first liquid crystal panel 121 and the second liquid crystal panel 122 are both in the converging state, the multifocal lens may have the third focal length formed by the combination of the first liquid crystal panel 121 and the second liquid crystal panel 122. When the multifocal lens 12 selects the first focal length, the image on the display panel may be imaged on the first image plane 13a. When the multifocal lens 12 selects the second focal length, the image on the display panel may be imaged in the second image plane 13b. When the multifocal lens 12 selects the third focal length, the image on the display panel can be imaged on the third image plane 13c. Therefore, the multifocal lens of the display apparatus can switch among at least three focal lengths, thereby achieving imaging at at least three depth spaces.

It should be noted that, in the embodiments described in detail above or below, only the case where the multifocal lens 12 has two liquid crystal panels is described in detail as an example. However, the case of having two or more liquid crystal panels is also suitable for the present disclosure. In the case where the multifocal lens includes N (N≥2) liquid crystal panels, it may have at least $C_N^1+C_N^2+C_N^3+\ldots+C_N^N$ focal lengths.

The display apparatus provided by the embodiments of the present disclosure may be, for example, an AR display apparatus, a VR display apparatus, or other 3D display apparatus.

In the related art, a 3D display apparatus provides binocular parallax, which supports convergence at a plurality of points in depth space. However, an imaging lens having a fixed focal length allows only an image to be formed on the image plane, and the user's eyes can only be accommodated on the image plane, thereby suffering from accommodation-convergence conflict. The conventional display typically decouples the accommodation cue and the convergence cue and associates the accommodation cue with a fixed distance. Therefore, this accommodation-convergence conflict can cause visual fatigue, dizziness or other discomfort to the user during viewing of a stereoscopic image.

According to the display apparatus provided by some embodiments of the present disclosure, since the multifocal lens (as an imaging lens) of the display apparatus can switch among a plurality of focal lengths, different focal lengths of the imaging lens can be selected based on different virtual display contents, thereby effectively alleviating visual fatigue, dizziness, and other visual discomfort due to accommodation-convergence conflicts.

In some embodiments of the present disclosure, the display apparatus may further include a light guiding structure configured to guide light emerging from the multifocal lens towards the user's eyes. Where the display apparatus is a VR display apparatus, the light guiding structure can be configured to be opaque to ambient light so that the user cannot see the real object in the surrounding environment and only sees the image displayed on the display panel. Where the display apparatus is an AR display apparatus, the light guiding structure is further configured to guide ambient light toward the user's eyes so that the user can see an image of the object on the display panel and the real object in the surrounding environment.

In the following description, the display apparatus is an AR display apparatus as an example for detailed description. The VR display apparatus may have a structure substantially similar to that of the AR display apparatus, except that the VR display apparatus is opaque to ambient light.

Figure 2:
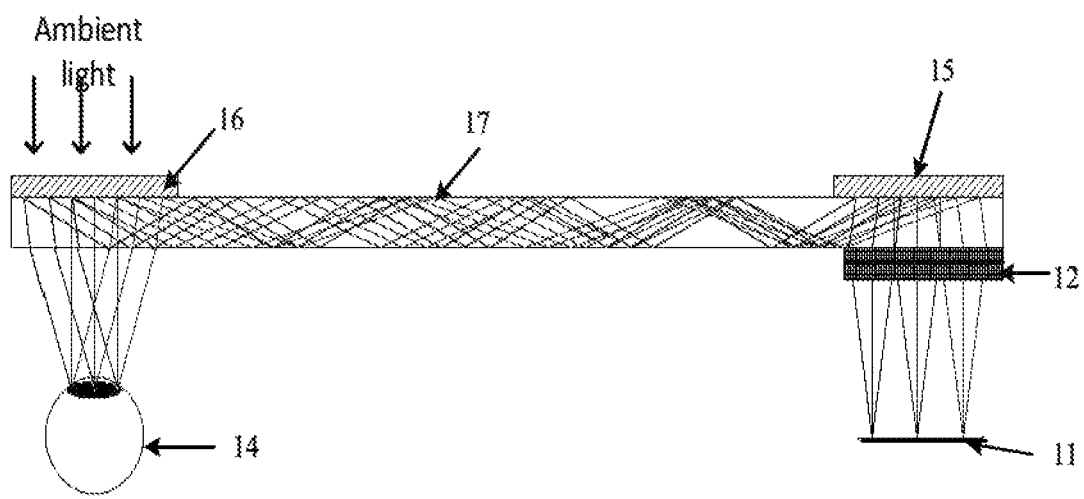
FIG. 2 shows a schematic diagram of a light guiding structure according to some embodiments of the disclosure.

FIG. 2 shows a schematic diagram of a light guiding structure according to some embodiments of the present disclosure. As shown in FIG. 2, the light guiding structure may include an in-coupling grating 15, a light guide plate 17, and an out-coupling grating 16. The in-coupling grating 15 and the multifocal lens 12 may be located at one end of the light guide plate 17, and the light guide plate 17 is interposed between the in-coupling grating 15 and the multifocal lens 12. The out-coupling grating 16 may be located at the other end of the light guide plate 17 and at the same side of the light guide plate 17 as the in-coupling grating 15. The in-coupling grating 15 can couple the light emitted from the multi-focal lens 12 to the light guide plate 17. The light coupled by the in-coupling grating 15 propagates in the light guide plate 17 to the other end of the light guide plate 17, and is then coupled out of the light guide plate 17 by the out-coupling grating 16 and received by the user's eye 14. In the case where the display apparatus of the present disclosure is an AR display apparatus, the out-coupling grating 16 and the light guide plate 17 can also transmit ambient light so that the user can see an image of an object on the display panel 11 and a real object in the surrounding environment.

Figure 3:
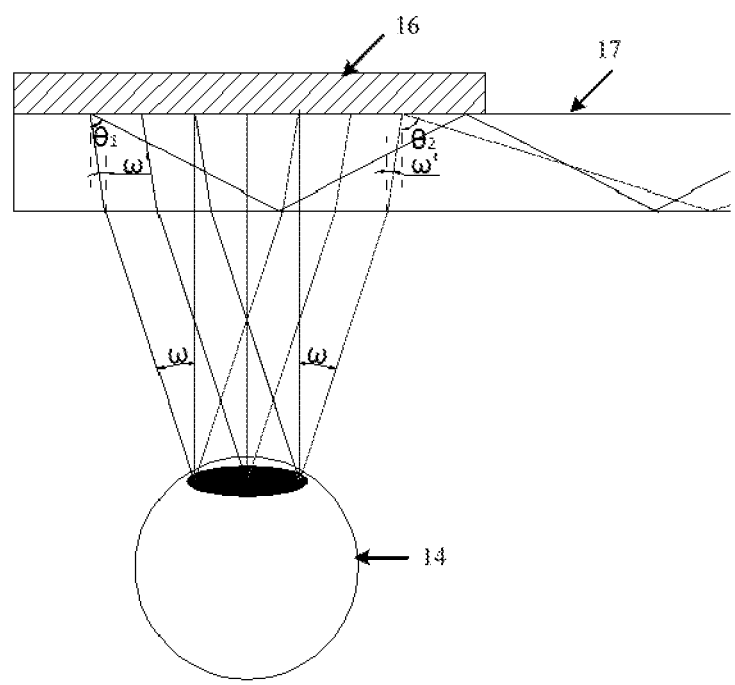
FIG. 3 shows a half angle of view ω of the display apparatus, a refraction angle ω' in a light guide plate, and diffraction angles θ1 and θ2 of the grating according to some embodiments of the present disclosure.

The angle of view of the display apparatus depends on the grating constant of the out-coupling grating 16 and the refractive index of the light guide plate 17. FIG. 3 illustrates a half angle of view ω of a display apparatus, a refraction angle ω' inside a light guide plate, and diffraction angles θ1 and θ2 of a grating according to some embodiments of the present disclosure.

According to the law of refraction, there are:

$$\sin\omega = n' \sin\omega' \quad (1)$$

According to the grating equation and the total reflection condition of the light guide plate 17, the following equation can be derived:

$$n' d\sin\theta_1 + n' d\sin\omega' = \lambda \quad (2)$$

$$n' d\sin\theta_2 - n' d\sin\omega' = \lambda \quad (3)$$

$$\frac{1}{n'} \leq \sin\theta_1 < 1 \quad (4)$$

$$\frac{1}{n'} \leq \sin\theta_2 < 1 \quad (5)$$

Wherein, n' is the refractive index of the light guide plate 17, and d is the grating constant (grating period) of the coupling grating 16.

Based on the formulas (1)-(5), it can be derived:

$$\begin{cases} \frac{\lambda}{d} - n' < \sin\omega \leq \frac{\lambda}{d} - 1 \\ 1 - \frac{\lambda}{d} \leq \sin\omega < n' - \frac{\lambda}{d} \end{cases} \quad (6)$$

Thus, the half angle of view ω and the grating constant d have the following relationship:

$$\omega(d) = \min\left\{\arcsin\left(\frac{\lambda}{d} - 1\right), \arcsin\left(n' - \frac{\lambda}{d}\right)\right\} \quad (7)$$

It can be further obtained from equation (7) that the relationship between the half angle of view and the grating constant has the following relationship:

$$\omega(d) = \begin{cases} \arcsin\left(n' - \frac{\lambda}{d}\right) & \frac{\lambda}{d} \leq d \leq \frac{2\lambda}{n'+1} \\ \arcsin\left(\frac{\lambda}{d} - 1\right) & \frac{2\lambda}{n'+1} \leq d \leq \lambda \end{cases} \quad (8)$$

Figure 4:
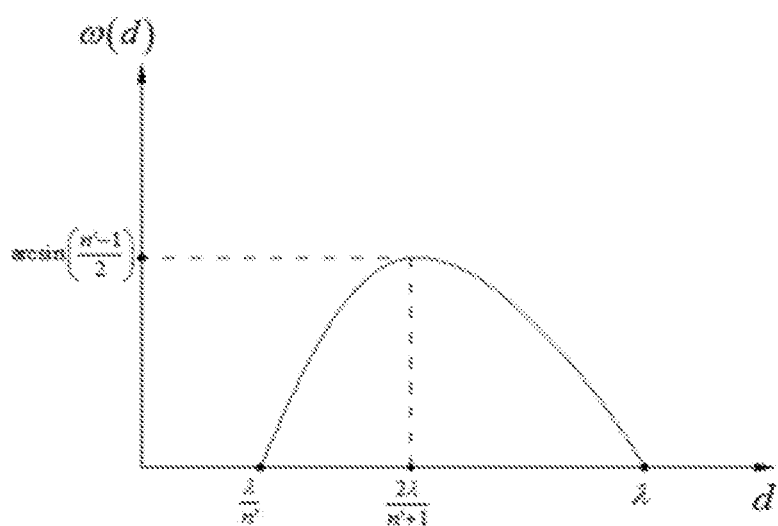
FIG. 4 is a graph showing a relationship between a half angle of view w and a grating constant d of a display apparatus according to some embodiments of the present disclosure.

FIG. 4 is a graph showing a relationship between a half angle of view ω and a grating constant d of a display apparatus according to some embodiments of the present disclosure. As shown in FIG. 4, the half angle of view has a maximum value when $$d = \frac{2\lambda}{n'+1}.$$

Therefore, in one embodiment of the disclosure, the grating constant d of the out coupling grating can be set as $$d = \frac{2\lambda}{n'+1}$$

to obtain the maximum angle of view of the display apparatus.

Figure 5:
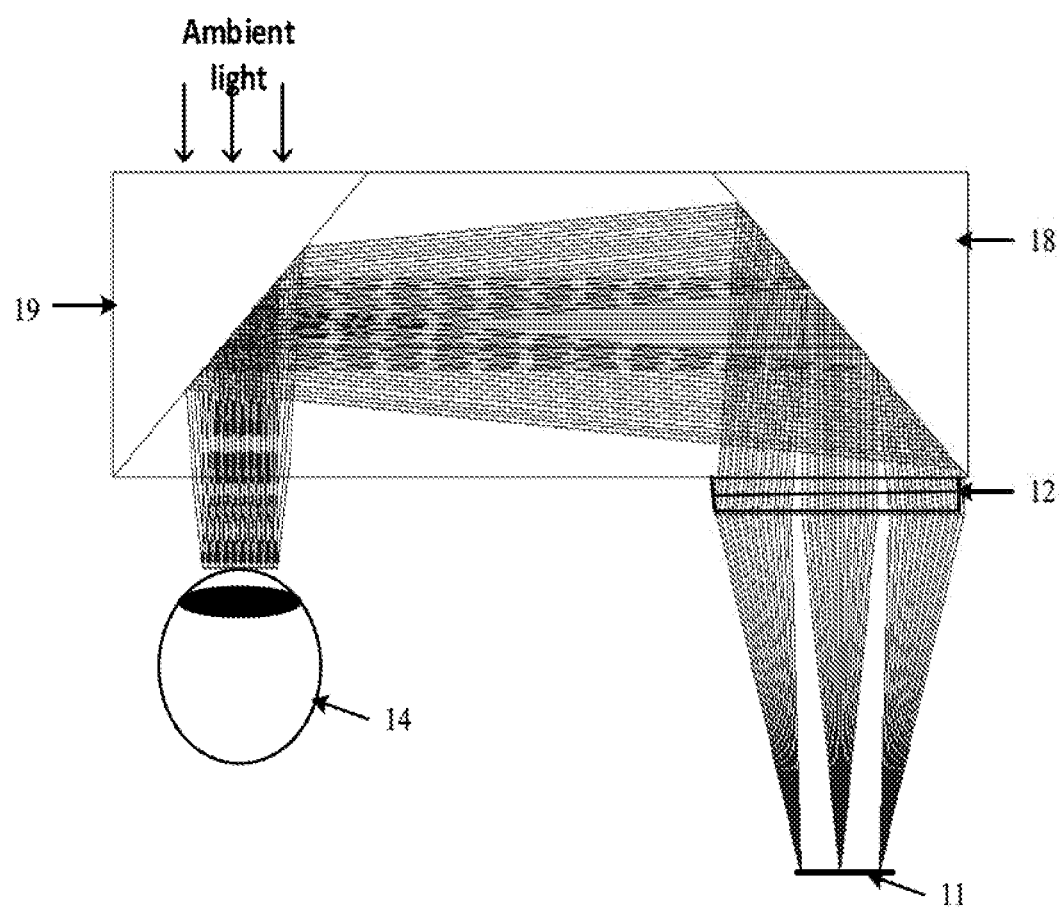
FIG. 5 illustrates a schematic diagram of a light guiding structure according to some embodiments of the present disclosure.

FIG. 5 shows a schematic diagram of a light guiding structure according to some embodiments of the present disclosure. As shown in FIG. 5, the light guiding structure may include a first polarization beam splitting prism 18 and a second polarization beam splitting prism 19. The first polarization beam splitting prism 18 can reflect light from the multifocal lens 12 to the second polarization beam splitting prism 19. The second polarization beam splitting prism 19 can reflect light from the first polarization beam splitting prism 18 to the user's eyes 14. In the case where the display apparatus is an AR display apparatus, the second polarization beam splitting prism 19 can also transmit ambient light and guide the ambient light to the user's eyes.

In some embodiments of the present disclosure, the first polarization beam splitting prism 18 and the second polarization beam splitting prism 19 may be a cubic structure formed by the following method: a plurality of optical films having a high refractive index and a plurality of optical films having a low refractive index are alternately vapor deposited on an inclined surface of a right-angle prism, which is then glued to a bevel of another identical prism.

Figure 6:
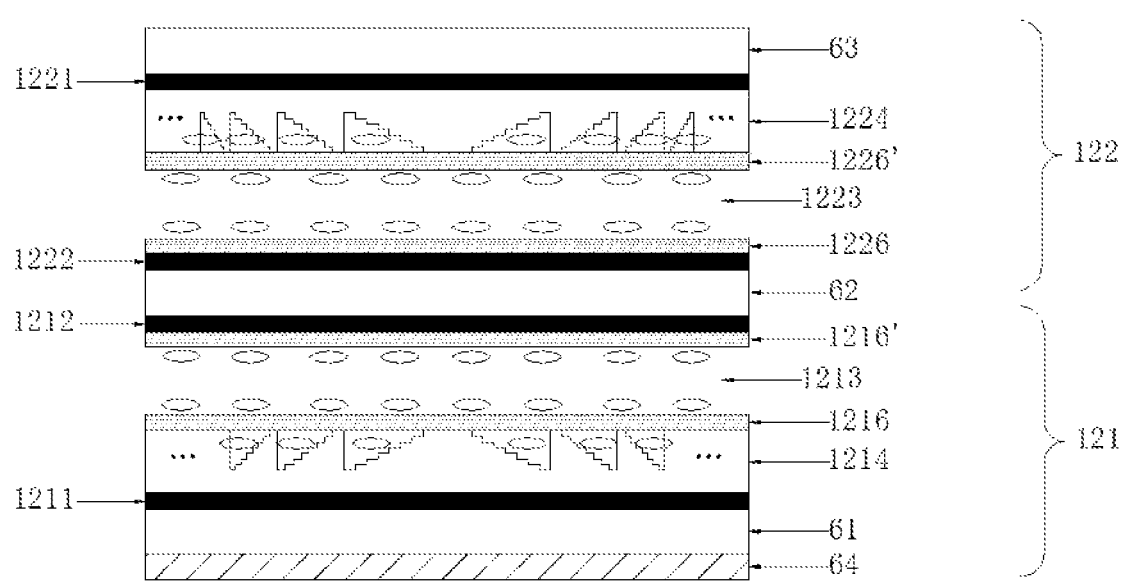
FIG. 6 shows a schematic diagram of a multifocal lens according to some embodiments of the present disclosure.

FIG. 6 shows a schematic diagram of an exemplary multifocal lens according to some embodiments of the present disclosure. As shown in FIG. 6, the multifocal lens 12 may include a first liquid crystal panel 121, a second liquid crystal panel 122, and a polarizer 64. The first liquid crystal panel 121 and the second liquid crystal panel 122 are stacked. The first liquid crystal panel 121 may include a first transparent electrode 1211, a second transparent electrode 1212, a first liquid crystal layer 1213 between the first transparent electrode 1211 and the second transparent electrode 1212, and a converging element 1214. Similarly, the second liquid crystal panel 122 may include a first transparent electrode 1221, a second transparent electrode 1222, a liquid crystal layer 1223 between the first transparent electrode 1221 and the second transparent electrode 1222, and a converging element 1224. In the embodiments as shown in FIG. 6, the converging element 1214 of the first liquid crystal panel 121 is located between the first transparent electrode 1211 and the liquid crystal layer 1213 of the first liquid crystal panel 121. The converging element 1224 of the second liquid crystal panel 122 is located between the first transparent electrode 1221 and the liquid crystal layer 1223 of the second liquid crystal panel 122. However, the position of the converging element of each liquid crystal panel is not limited thereto. For example, the converging elements of the first and second liquid crystal panels may be located on a side of the liquid crystal layer facing any of the first and second transparent electrodes of the respective liquid crystal panel.

In one embodiment, the first liquid crystal panel further comprises a first alignment film between the first base substrate and the second base substrate of the first liquid crystal panel, and the first alignment film 1216/1216' (a first alignment film layer 1216 and a second align film layer 1216') is next to the liquid crystal layer 1213 and configured to control orientation of liquid crystals in the liquid crystal layer 1213.

In one embodiment, the second liquid crystal panel further comprises a second alignment film between the first base substrate and the second base substrate of the second liquid crystal panel, and the second alignment film 1226/1226' is next to the liquid crystal layer 1223 and configured to control orientation of liquid crystals in the liquid crystal layer 1223.

In some embodiments of the present disclosure, the first transparent electrodes 1211, 1221 and the second transparent electrodes 1212, 1222 of liquid crystal panel each are planar electrodes.

In some embodiments, as shown in FIG. 6, the multifocal lens 12 may further include a first substrate 61, a second substrate 62, and a third substrate 63. The first substrate 61, the second substrate 62, and the third substrate may be base substrates of liquid crystal panels. The second substrate 62 is located between the first substrate 61 and the third substrate 63. The first liquid crystal panel 121 is located between the first substrate 61 and the second substrate 62, and the second liquid crystal panel 122 is located between the second substrate 62 and the third substrate 63. The polarizer 64 is located on a side of the first substrate 61 opposites from the first liquid crystal panel 121.

In some embodiments, the liquid crystals or liquid crystal molecules in the liquid crystal layers 1213, 1223 of each liquid crystal panel may have an initial alignment direction parallel to the transmission axis of the polarizer 64 such that the polarization direction of the light incident onto the liquid crystal layer is parallel to the long axes of the liquid crystal molecules. Illustratively in FIG. 6, the long axes of the liquid crystal molecules are parallel to the first substrate 61. In one embodiment of the present disclosure, the liquid crystal molecules in the liquid crystal layer may be initially aligned by any known technique, such as a rubbing alignment technique or a photo-alignment technique.

In some embodiments, the liquid crystal layer of each liquid crystal panel may switch between a first refractive index and a second refractive index based on a voltage applied to the respective first transparent electrode and the second transparent electrode. The first refractive index is smaller than the refractive index of the converging element of the corresponding liquid crystal panel, and the second refractive index is equal to the refractive index of the converging element of the corresponding liquid crystal panel. In an exemplary embodiment, the control unit may control the voltage applied to the two transparent electrodes of each liquid crystal panel.

In some embodiments, when the liquid crystal layer 1213 of the first liquid crystal panel 121 has a first refractive index, and the liquid crystal layer 1223 of the second condensed state switchable lens 122 has a second refractive index, the first liquid crystal panel 121 is in a converging state, and the second liquid crystal panel 122 is in a non-converging state. In this case, the first liquid crystal panel 121 can function as a focus lens having a first focal length f1', and the second liquid crystal panel 122 can function as a transparent flat plate. Accordingly, the multifocal lens 12 can have the first focal length f1' of the first liquid crystal panel 121.

In some embodiments, when the liquid crystal layer 1213 of the first liquid crystal panel 121 has a second refractive index, and the liquid crystal layer 1223 of the second condensed state switchable lens 122 has a first refractive index, the first liquid crystal panel 121 is in a non-converging state, and the second liquid crystal panel 122 is in a converging state. In this case, the first liquid crystal panel 121 may function as a transparent flat plate, and the second liquid crystal panel 122 may function as a focus lens having a second focal length 12'. Accordingly, the multifocal lens 12 may have the second focal length f2' of the second liquid crystal panel 122.

In some embodiments, when the liquid crystal layer 1213 of the first liquid crystal panel 121 and the liquid crystal layer 1223 of the second liquid crystal panel 122 both have a first refractive index, both the first liquid crystal panel 121 and the second liquid crystal panel 122 are in a converging state. In this case, the first liquid crystal panel 121 can function as a focus lens having a first focal length f1', and the second liquid crystal panel 122 can function as a focus lens having a second focal length f2'. Accordingly, the multifocal lens 12 may have a third focal length f3' combined by the first focal length f1' of the first liquid crystal panel 121 and the second focal length f2' of the second liquid crystal panel 122.

The manner of switching among the plurality of focal lengths of the multifocal lens in the embodiments shown in FIG. 6 will be described in detail below with reference to FIGS. 7-9.

Figure 7:
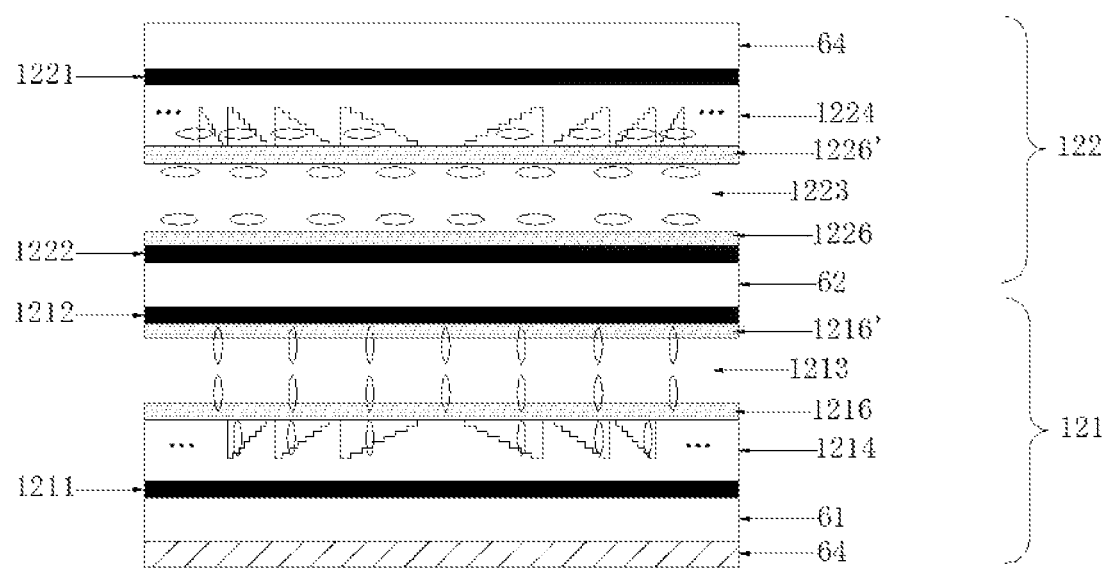
FIG. 7 shows a case where the multifocal lens shown in FIG. 6 has a first focal length of the first condensed state switchable lens according to some embodiments of the present disclosure.

FIG. 7 shows a case where the multifocal lens shown in FIG. 6 has the first focal length of the first liquid crystal panel according to some embodiments of the present disclosure. As shown in FIG. 7, the control unit generates a voltage difference between the first transparent electrode 1211 and the second transparent electrode 1212 of the first liquid crystal panel 121, and generates no voltage difference between the first transparent electrode 1221 and the second transparent electrode 1222 of the second liquid crystal panel 122. As such, the liquid crystal molecules in the liquid crystal layer 1213 of the first condensing state switchable lens 121 are deflected in the direction of the electric field driven by the vertical electric field. In this case, the long axes of the liquid crystal molecules in the liquid crystal layer 1213 of the first liquid crystal panel 121 are perpendicular to the transmission axis of the polarizer 64. For the incident polarized light, the liquid crystal layer 1213 of the first liquid crystal panel 121 has a first refractive index. Since there is no voltage difference between the two electrodes of the second liquid crystal panel 122, the liquid crystal molecules in the liquid crystal layer 1223 of the second liquid crystal panel 122 are not deflected. For the incident polarized light, the liquid crystal layer of the second liquid crystal panel 122 has a second refractive index. Since the first refractive index is smaller than the refractive index of the converging element of the corresponding liquid crystal panel, and the second refractive index is equal to the refractive index of the converging element of the corresponding liquid crystal panel, the first liquid crystal panel 121 can function as a focus lens having a first focal length f1', and the second liquid crystal panel 122 can function as a transparent flat plate (without converging action). At this time, the multifocal lens 12 may have the first focal length f1' of the first liquid crystal panel 121. The first focal length f1' is an equivalent focal length formed by the converging element 1214 and the liquid crystal layer 1213 of the first liquid crystal panel 121.

Figure 8:
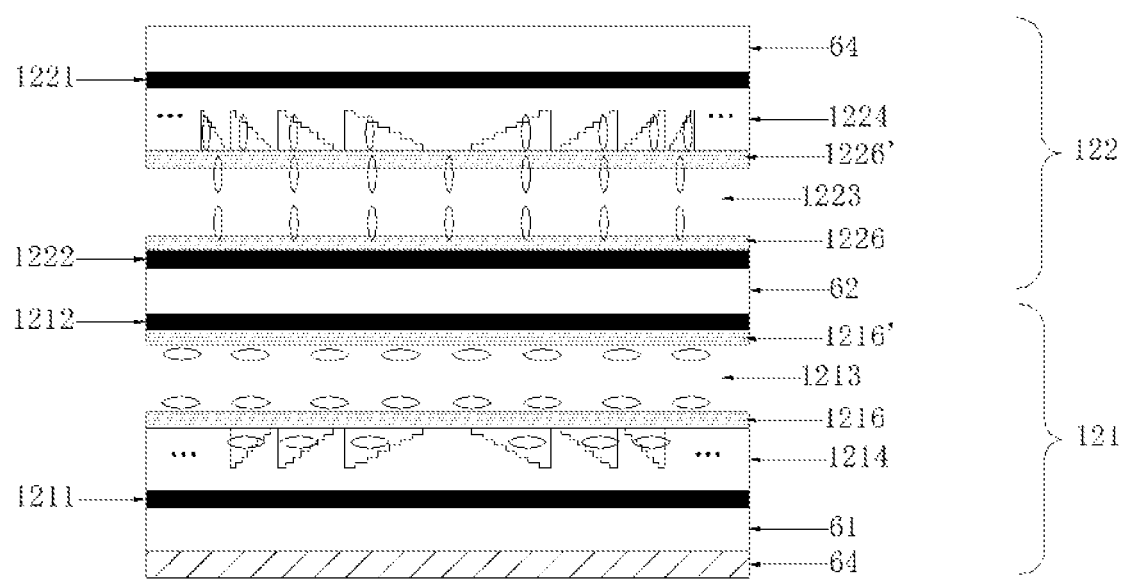
FIG. 8 shows a case where the multifocal lens shown in FIG. 6 has a second focal length of the second condensed state switchable lens according to some embodiments of the present disclosure.

FIG. 8 shows a case where the multifocal lens shown in FIG. 6 has the second focal length of the second liquid crystal panel according to some embodiments of the present disclosure. As shown in FIG. 8, the control unit 64 generates a voltage difference between the first transparent electrode 1221 and the second transparent electrode 1222 of the second liquid crystal panel 122, and generates no voltage difference between the first transparent electrode 1211 and the second transparent electrode 1212 of the first liquid crystal panel 121. As such, the liquid crystal molecules in the liquid crystal layer 1223 of the second condensing state switchable lens 122 are deflected in the direction of the electric field driven by the vertical electric field. In this case, the long axes of the liquid crystal molecules in the liquid crystal layer 1223 of the second liquid crystal panel 122 are perpendicular to the transmission axis of the polarizer 64. For incident polarized light, the liquid crystal layer 1223 of the second liquid crystal panel 122 has a first refractive index. Since there is no voltage difference between the two electrodes of the first liquid crystal panel 121, the liquid crystal molecules in the liquid crystal layer 1213 of the first liquid crystal panel 121 are not deflected. For incident polarized light, the liquid crystal layer 1213 of the first liquid crystal panel 121 has a second refractive index. Since the first refractive index is smaller than the refractive index of the converging element of the corresponding liquid crystal panel, and the second refractive index is equal to the refractive index of the converging element of the corresponding liquid crystal panel, the second liquid crystal panel 122 can function as a focus lens having a second focal length f2', and the first liquid crystal panel 121 can function as a transparent flat plate (without converging action). At this time, the multifocal lens 12 may have the second focal length f2' of the second liquid crystal panel 122. The second focal length f2' is an equivalent focal length formed by the converging element 1224 and the liquid crystal layer 1223 of the second liquid crystal panel 122.

Figure 9:
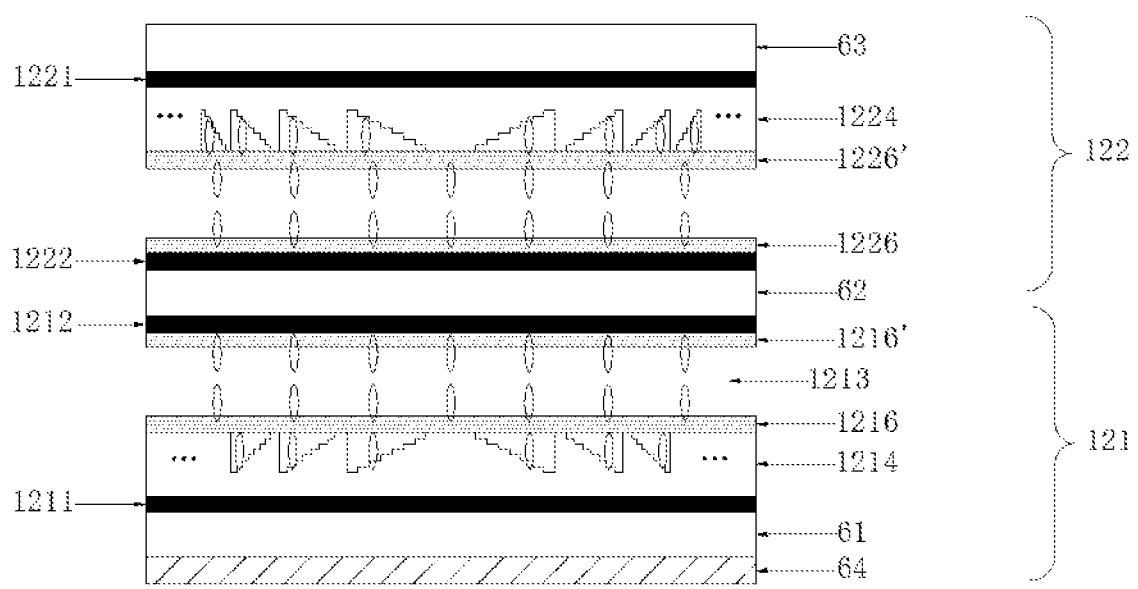
FIG. 9 shows a case where the multifocal lens shown in FIG. 6 has a third focal length formed by a combination of a first condensed state switchable lens and a second condensed state switchable lens according to some embodiments of the present disclosure.

FIG. 9 shows a case where the multifocal lens shown in FIG. 6 has the third focal length combined by the first liquid crystal panel and the second liquid crystal panel according to some embodiments of the present disclosure. As shown in FIG. 9, the control unit generates a voltage difference between the first transparent electrode 1211 and the second transparent electrode 1212 of the first liquid crystal panel 121, and also generates a voltage difference between the first transparent electrode 1221 and the second transparent electrode 1222 of the second liquid crystal panel 122. As such, the liquid crystal molecules in the liquid crystal layer of the first and second condensing state switchable lens are deflected in the direction of the electric field driven by the vertical electric field. In this case, the long axes of the liquid crystal molecules in the liquid crystal layer of the first and second liquid crystal panel are perpendicular to the transmission axis of the polarizer 64. For incident polarized light, the liquid crystal layer of the first and second liquid crystal panel both have a first refractive index. Since the first refractive index is smaller than the refractive index of the converging element of the corresponding liquid crystal panel, the first liquid crystal panel 121 can function as a focus lens having a first focal length f1', and the second liquid crystal panel 122 can function as a focus lens having a second focal length f2'. At this time, the multifocal lens 12 may have a third focal length f3' combined by a first focal length f1' of the first liquid crystal panel 121 and a second focal length l2' of the second liquid crystal panel 122.

Therefore, through the control unit controlling the voltage difference between the two electrodes of the first liquid crystal panel 121 and the voltage difference between the two electrodes of the second condensing state switchable lens 122, the multifocal lens can switch among at least 3 focal lengths. The following three focal lengths have the following relationship:

$$f_3' = -\frac{f_1' f_2'}{d - f_1' - f_2'} \qquad (9)$$

Wherein d is the equivalent distance between the first liquid crystal panel and the second liquid crystal panel.

Figure 10:
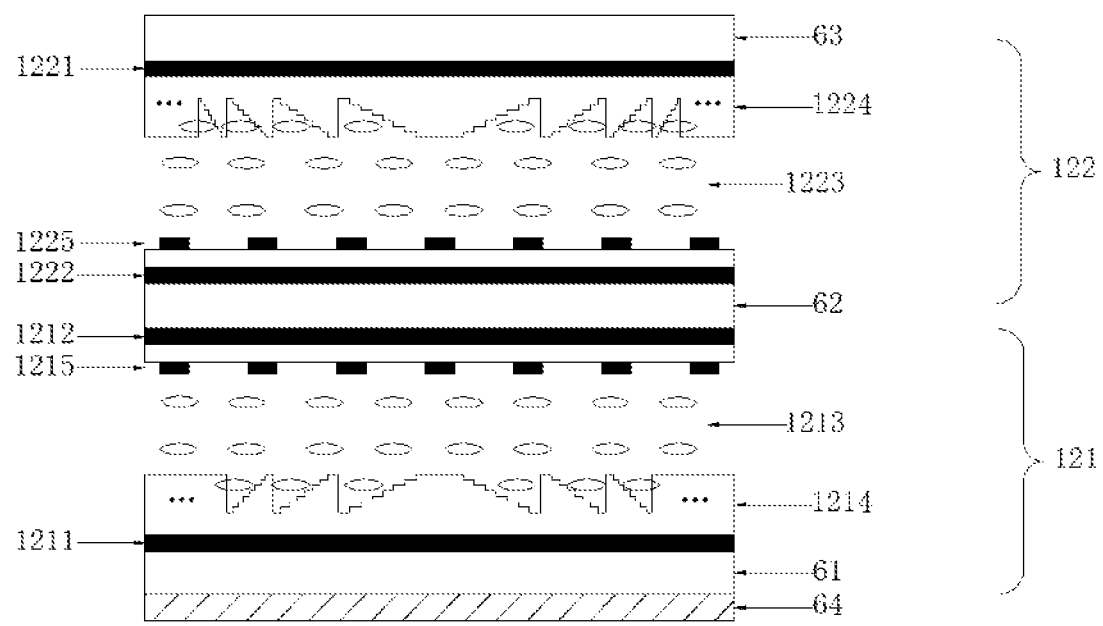
FIG. 10 shows a schematic diagram of a multifocal lens according to some embodiments of the present disclosure.

FIG. 10 shows a schematic diagram of a multi-focal lens according to some embodiments of the present disclosure. In the embodiments shown in FIG. 10, in addition to the components shown in FIG. 6, the first liquid crystal panel 121 and the second liquid crystal panel 122 also includes a third transparent electrode 1215, 1225 respectively. The third transparent electrodes 1215, 1225 of the liquid crystal panels are located on a side of the corresponding liquid crystal layer opposite from the corresponding converging element, and are insulated from the corresponding second transparent electrode. In these embodiments, based on the voltage applied to the corresponding first transparent electrode, second transparent electrode, and third transparent electrode, each of liquid crystal layers of the first liquid crystal panel 121 and the second liquid crystal panel 122 may switch from one of the first refractive index and the second refractive index to the other. As such, the multifocal lens can switch among the first focal length, the second focal length, and the third focal length. In an exemplary embodiment, the third transparent electrode of each liquid crystal panel may include a plurality of parallel strip electrodes.

In the embodiments shown in FIG. 10, since each liquid crystal panel has a third transparent electrode, when the control unit generates an appropriate voltage difference between the third transparent electrode and the first transparent electrode, it can cause the liquid crystal molecules in the liquid crystal layer to have an orientation parallel to the transmission axis of the polarizer. As such, it is not necessary to initially align the liquid crystal molecules in the liquid crystal layer.

The manner of switching among the plurality of focal lengths of the multifocal lens in the embodiments shown in FIG. 10 will be described in detail below with reference to FIGS. 11-13.

Figure 11:
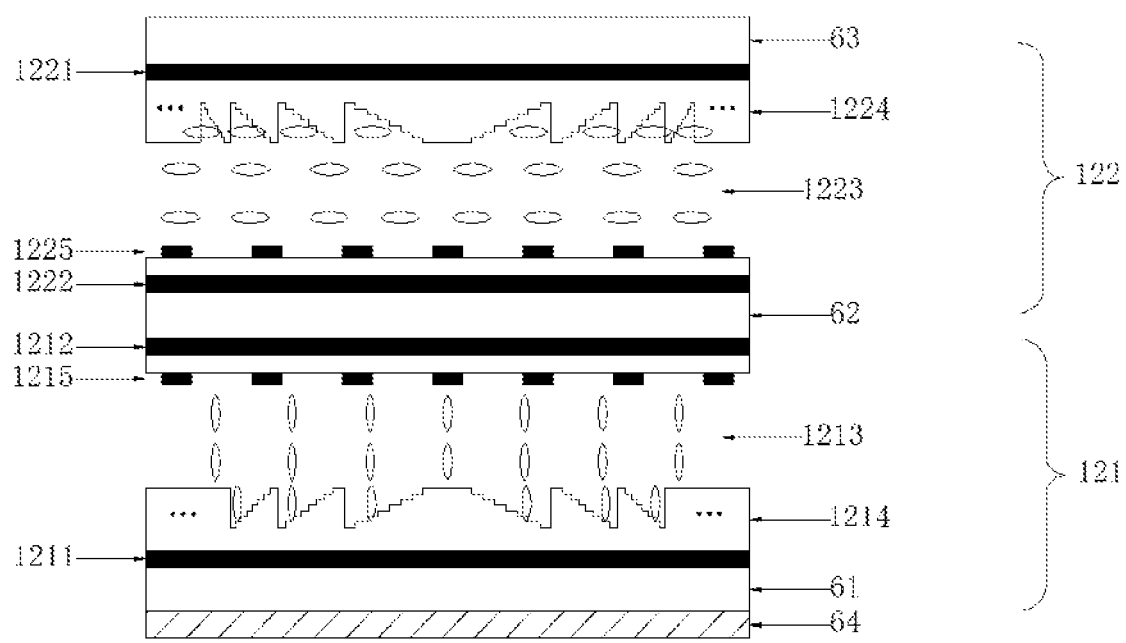
FIG. 11 shows a case where the multifocal lens shown in FIG. 10 has the first focal length of the first condensed state switchable lens according to some embodiments of the present disclosure.

FIG. 11 shows a case where the multifocal lens shown in FIG. 10 has the first focal length of the first liquid crystal panel according to some embodiments of the present disclosure. As shown in FIG. 11, the control unit may generate a voltage difference between the first transparent electrode 1211 and the second transparent electrode 1212 of the first liquid crystal panel 121, and no voltage is applied to the third transparent electrode 1215 of the first liquid crystal panel 121. Furthermore, a voltage difference is generated between the second transparent electrode 1222 and the third transparent electrode 1225 of the second liquid crystal panel 122, and no voltage is applied to the first transparent electrode 1221 of the second liquid crystal panel 122. In this case, the liquid crystal molecules in the liquid crystal layer 1213 of the first liquid crystal panel 121 have a vertical orientation under the action of the vertical electric field between the first and second transparent electrodes of the first liquid crystal panel 121, that is, the long axis direction is perpendicular to the transmission axis of the polarizer 64. For incident polarized light, the liquid crystal layer 1213 of the first liquid crystal panel 121 has a first refractive index. The liquid crystal molecules in the liquid crystal layer 1223 of the second liquid crystal panel 122 have a horizontal orientation under the action of an electric field generated by the second transparent electrode 1222 and the third transparent electrode 1225 of the second liquid crystal panel 122. That is, the long axis direction is parallel to the transmission axis of the polarizer. For incident polarized light, the liquid crystal layer 1223 of the second liquid crystal panel 122 has a second refractive index. The first refractive index is smaller than the refractive index of the converging element of the corresponding liquid crystal panel, and the second refractive index is equal to the refractive index of the converging element of the corresponding liquid crystal panel. Thus, the first liquid crystal panel 121 can be used as a focusing lens having a first focal length f1', and the second liquid crystal panel 122 can function as a transparent plate (without converging effect). At this time, the multifocal lens 12 may have the first focal length f1' of the first liquid crystal panel 121.

Figure 12:
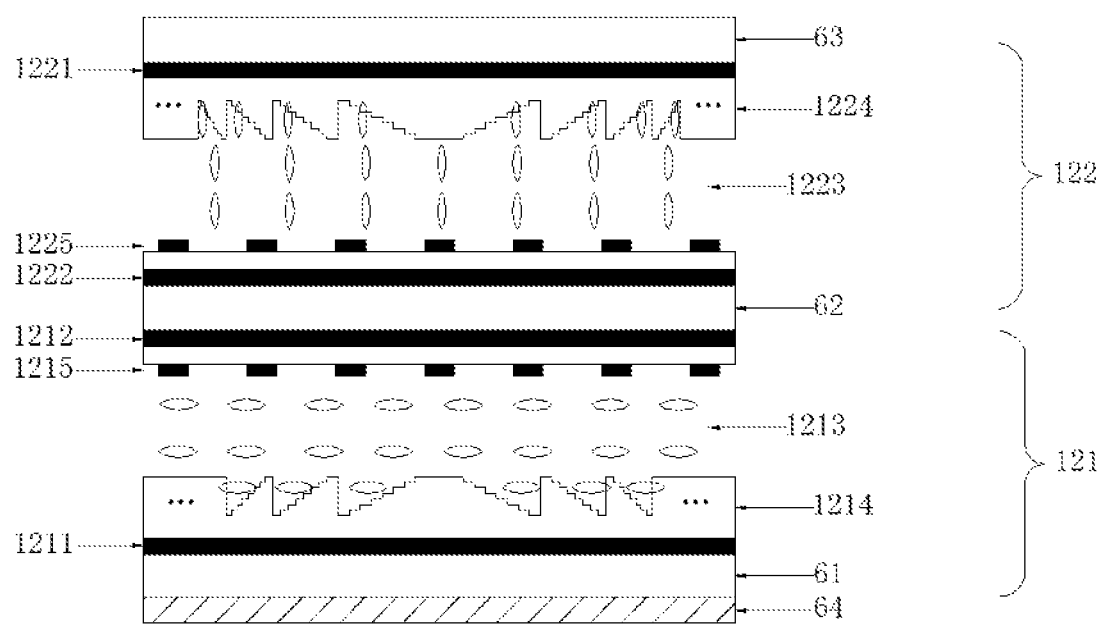
FIG. 12 shows a case where the multifocal lens shown in FIG. 10 has the second focal length of the second condensed state switchable lens according to some embodiments of the present disclosure.

FIG. 12 shows a case where the multifocal lens shown in FIG. 10 has the second focal length of the second liquid crystal panel according to some embodiments of the present disclosure. As shown in FIG. 12, the control unit may generate a voltage difference between the first transparent electrode 1221 and the second transparent electrode 1222 of the second liquid crystal panel 122, and no voltage is applied to the third transparent electrode 1225 of the second liquid crystal panel 122. Furthermore, a voltage difference is generated between the second transparent electrode 1212 and the third transparent electrode 1215 of the first liquid crystal panel 121, and no voltage is applied to the first transparent electrode 1211 of the first liquid crystal panel 121. In this case, the liquid crystal molecules in the liquid crystal layer 1223 of the second liquid crystal panel 122 have a vertical orientation under the action of the vertical electric field between the first and second transparent electrodes of the second liquid crystal panel 122, that is, the long axis direction is perpendicular to the transmission axis of the polarizer 64. For incident polarized light, the liquid crystal layer of the second liquid crystal panel 122 has a first refractive index. The liquid crystal molecules in the liquid crystal layer of the first liquid crystal panel 121 have a horizontal orientation under the action of an electric field generated by the second transparent electrode 1212 and the third transparent electrode 1215 of the first liquid crystal panel 121. That is, the long axis direction is parallel to the transmission axis of the polarizer 64. For incident polarized light, the liquid crystal layer 1213 of the first liquid crystal panel 121 has a second refractive index. The first refractive index is smaller than the refractive index of the converging element of the corresponding liquid crystal panel, and the second refractive index is equal to the refractive index of the converging element of the corresponding liquid crystal panel. As such, the second liquid crystal panel 122 can be used as a focusing lens having a second focal length f2', and the first liquid crystal panel 121 can function as a transparent plate (without converging effect). At this time, the multifocal lens 12 may have the second focal length 12' of the second liquid crystal panel 122.

Figure 13:
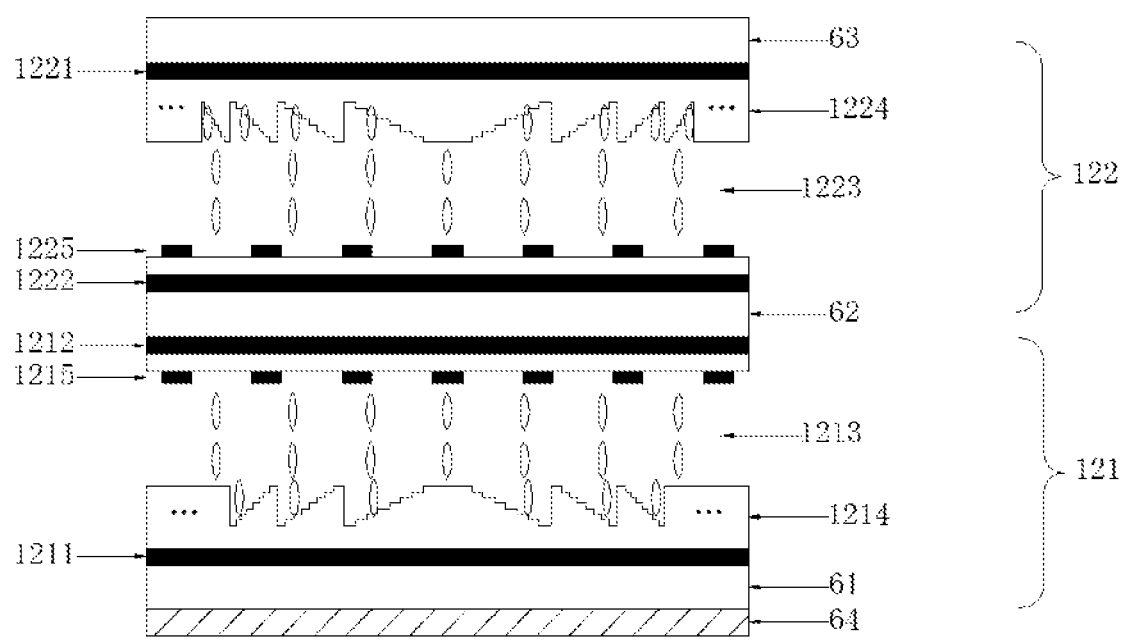
FIG. 13 shows a case where the multifocal lens shown in FIG. 10 has a third focal length formed by a combination of a first condensed state switchable lens and a second condensed state switchable lens according to some embodiments of the present disclosure.

FIG. 13 shows a case where the multifocal lens shown in FIG. 10 has the third focal length combined by the first liquid crystal panel and the second liquid crystal panel according to some embodiments of the present disclosure. As shown in FIG. 13, the control unit may generate a voltage difference between the first transparent electrode 1211 and the second transparent electrode 1212 of the first liquid crystal panel 121, and no voltage is applied to the third transparent electrode 1215 of the first liquid crystal panel 121. Furthermore, a voltage difference is generated between the second transparent electrode 1222 and the first transparent electrode 1221 of the second liquid crystal panel 122, and no voltage is applied to the third transparent electrode 1225 of the second liquid crystal panel 122. In this case, the liquid crystal molecules in the liquid crystal layer 1213 of the first liquid crystal panel 121 have a vertical orientation under the action of the vertical electric field between the first and second transparent electrodes of the first liquid crystal panel 121. The liquid crystal molecules in the liquid crystal layer 1223 of the second liquid crystal panel 122 have a vertical orientation under the action of the vertical electric field between the first and second transparent electrodes of the second liquid crystal panel 122. That is, the long axis direction is perpendicular to the transmission axis of the polarizer. For incident polarized light, the liquid crystal layers of the first and second liquid crystal panel both have a first refractive index. The first refractive index is smaller than the refractive index of the converging element of the corresponding liquid crystal panel. As such, the first liquid crystal panel 121 can be used as a focusing lens having a first focal length f1', and the second liquid crystal panel 122 can be used as a focusing lens having a second focal length f2'. At this time, the multifocal lens 12 may have the third focal length f3' combined by the first focal length f1' of the first liquid crystal panel 121 and the second focal length f2' of the second liquid crystal panel 122.

Since the multifocal lens 12 in the embodiment shown in FIG. 6 or FIG. 10 can have three converging state switchable focal lengths, the display apparatus using such a multifocal lens provided by the embodiment of the present disclosure can form virtual images at three converging state switchable imaging spatial depths.

In some embodiments, there is also a second liquid crystal cell form for realizing the above-mentioned switchable diffractive multifocal lens function: utilizing the ADS electrode mode or the IPS electrode mode, the multifocal lens does not require the first substrate and the third substrate are not required.

Figure 14A:
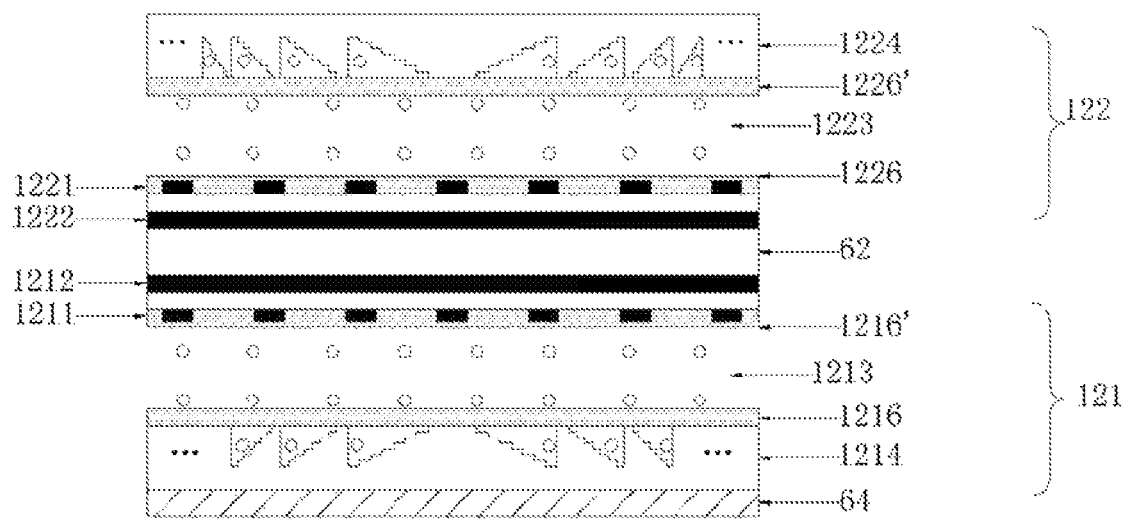
FIG. 14A shows a schematic diagram of a multifocal lens according to some embodiments of the present disclosure.

FIG. 14A shows a schematic diagram of a multi-focal lens according to some embodiments of the present disclosure. In the embodiments shown in FIG. 14A, the multifocal lens includes a polarizer, a first converging element, a first LC (liquid crystal) layer, a first transparent electrode, a first insulating layer, a second transparent electrode, a second substrate, a third transparent electrode, a second insulating layer, a fourth transparent electrode, a second LC layer and a second converging element.

Figure 14B:
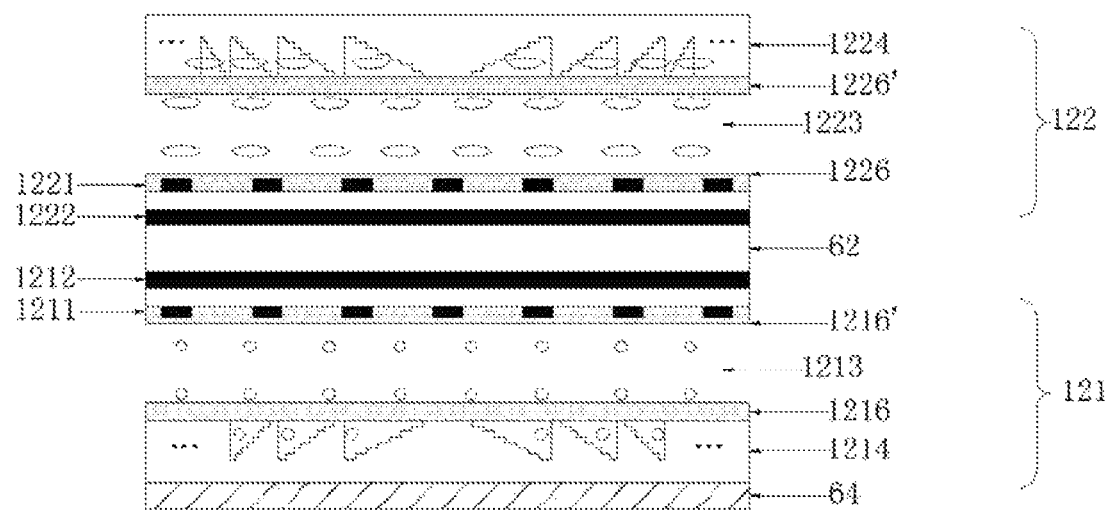
FIG. 14B shows a schematic diagram of a multifocal lens according to some embodiments of the present disclosure.
Figure 14:
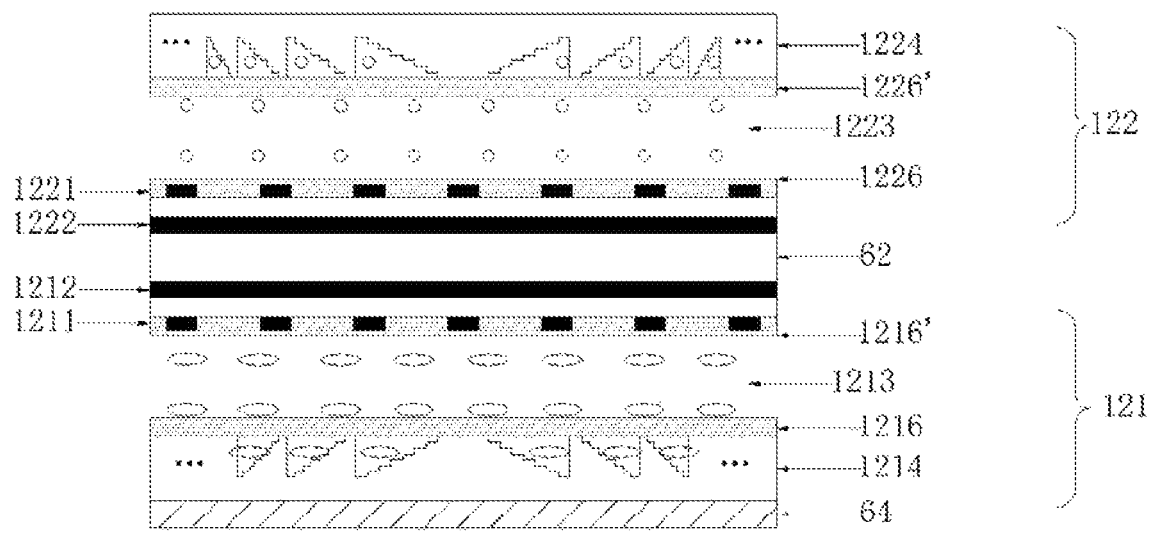
FIG. 14C shows a schematic diagram of a multifocal lens according to some embodiments of the present disclosure.

In some embodiments, the initial orientation direction of the liquid crystal molecules of the first LC layer and the second LC layer is perpendicular to the transmission axis of the polarizer. The first and fourth transparent electrodes are strip electrodes whose longer side is perpendicular to a transmission axis of the polarizer. The second and third transparent electrodes are all a planar electrode. When an appropriate voltage is applied to the third and fourth transparent electrodes while no voltage is applied onto the first and second transparent electrodes, the liquid crystal molecules in the second LC layer are driven by a horizontal electric field to form a deflection state as shown in FIG. 14B. At this time, the long axes of the liquid crystal molecules in the first LC layer are perpendicular to the transmission axis of the polarizer, and accordingly the liquid crystals have a relatively low refractive index $n_0$ with respect to the incident polarized light. The long axes of liquid crystal molecules in the second LC layer are parallel to the transmission axis of the polarizer, and accordingly the liquid crystal layer has a relatively high refractive index $n_e$ with respect to incident polarized light. The refractive index n values of the first and second converging elements are designed to be the same as the high refractive index $n_e$ of the liquid crystal layer. Therefore, for the liquid crystal deflection state shown in FIG. 14B, the first switchable converging element of this state functions as a focus lens. The second switchable converging element functions as a flat glass, and the structural device as a whole is a diffractive lens having a focal length value of f1'.

Similarly, in some embodiments, when an appropriate voltage is applied to the first and second transparent electrodes and no voltage is applied to the third and fourth transparent electrodes, the liquid crystal molecules in the first liquid crystal layer are driven by the horizontal electric field to form a deflection state as shown in FIG. 14C. At this time, the long axes of the liquid crystal molecules in the first LC layer are parallel to the transmission axis of the polarizer, and accordingly the liquid crystals have a relatively high refractive index $n_e$ with respect to the incident polarized light. The long axes of liquid crystal molecules in the second LC layer are perpendicular to the transmission axis of the polarizer, and accordingly the liquid crystal layer has a relatively low refractive index $n_0$ with respect to incident polarized light. The refractive index n values of the first and second converging elements are designed to be the same as the high refractive index $n_e$ of the liquid crystal layer. Therefore, for the liquid crystal deflection state shown in FIG. 14C, the second switchable converging element of this state functions as a focus lens. The first switchable converging element functions as a flat glass, and the structural device as a whole is a diffractive lens having a focal length value of f2'.

Similarly, in some embodiments, when no voltage is applied to the first, second, third, and fourth transparent electrodes, the liquid crystal molecules in both the first and second LC layers are in an initial alignment state as shown in FIG. 14A, and the liquid crystal molecules in the first and second LC layers are both perpendicular to the transmission axis of the polarizer. The liquid crystals in both the first and second liquid crystal layers have a low refractive index $n_o$ with respect to incident polarized light. Therefore, for the liquid crystal state shown in FIG. 14A, the first and second switchable converging elements of this state both function as a focusing lens, and the structural device as a whole is a diffractive lens having a focal length value of f3'.

Figure 15A:
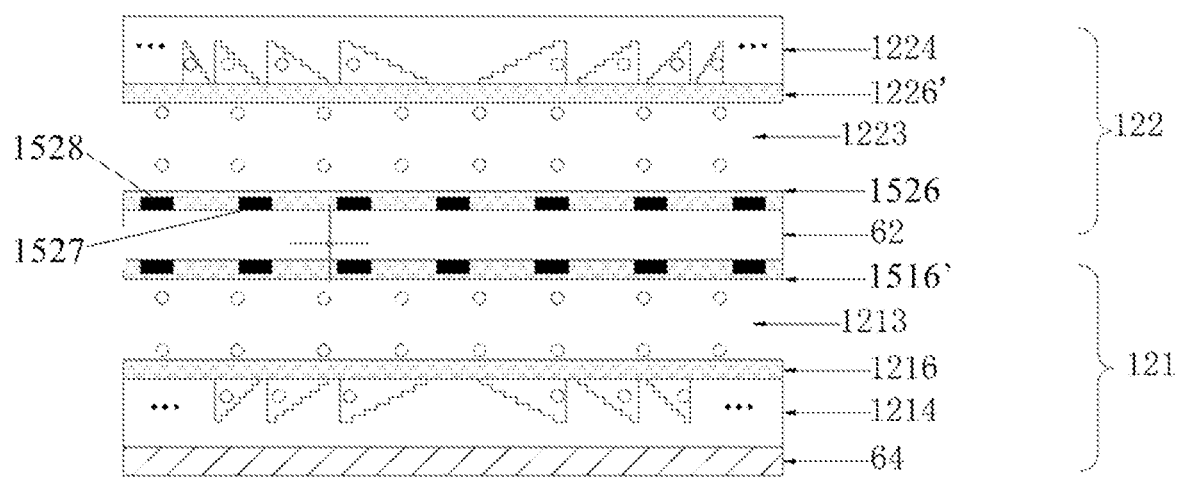
FIG. 15A shows a schematic diagram of a multifocal lens according to some embodiments of the present disclosure.

In some embodiments, under IPS electrode mode, as shown in FIG. 15A, the device mainly includes a polarizer, a first converging element, a first LC (liquid crystal) layer, a first transparent electrode 1516', a second substrate, a second transparent electrode 1526, and a second LC layer, and a second converging element. The first converging element may also function as a first substrate. The second converging element may also function as a third substrate.

Figure 15B:
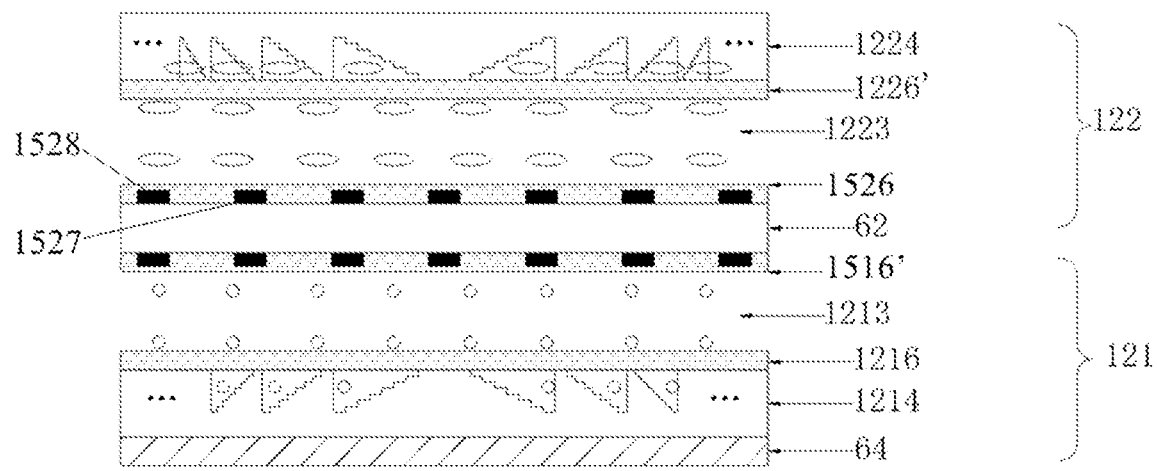
FIG. 15B shows a schematic diagram of a multifocal lens according to some embodiments of the present disclosure.

In some embodiments, the initial orientation direction of the liquid crystal molecules of the first LC layer and the second LC layer is perpendicular to the transmission axis of the polarizer. The first and second transparent electrodes are strip electrodes (a first strip transparent electrode 1516' and a second strip transparent electrode 1526) whose longer side is perpendicular to a transmission axis of the polarizer. Furthermore, the first and second transparent electrodes each further include a pixel electrode 1527 and a COM electrode 1528. When an appropriate voltage is applied to the pixel electrode 1527 and the COM electrode 1528 in the second transparent electrode, and no voltage is applied to the first transparent electrode, the liquid crystal molecules in the second liquid layer are driven by the horizontal electric field to form a deflection state as shown in FIG. 15B. The long axes of the liquid crystal molecules in the first LC layer is perpendicular to the transmission axis of the polarizer, and the liquid crystal layer has a relatively low refractive index $n_o$ with respect to the incident polarized light. The long axes of the liquid crystal molecules in the second LC layer are parallel to the transmission axis of the polarizer, and the second liquid crystal layer has a high refractive index $n_e$ with respect to the incident polarized light. The refractive indexes n of the first and second converging elements are designed to be the same as the high refractive index $n_e$ of the liquid crystal layer. Therefore, for the liquid crystal deflection state shown in FIG. 15B, the first switchable converging element of this state functions as a focus lens, and the second switchable converging element functions as a flat glass. As a whole, the multifocal lens has a focal length value of f1.

Figure 15C:
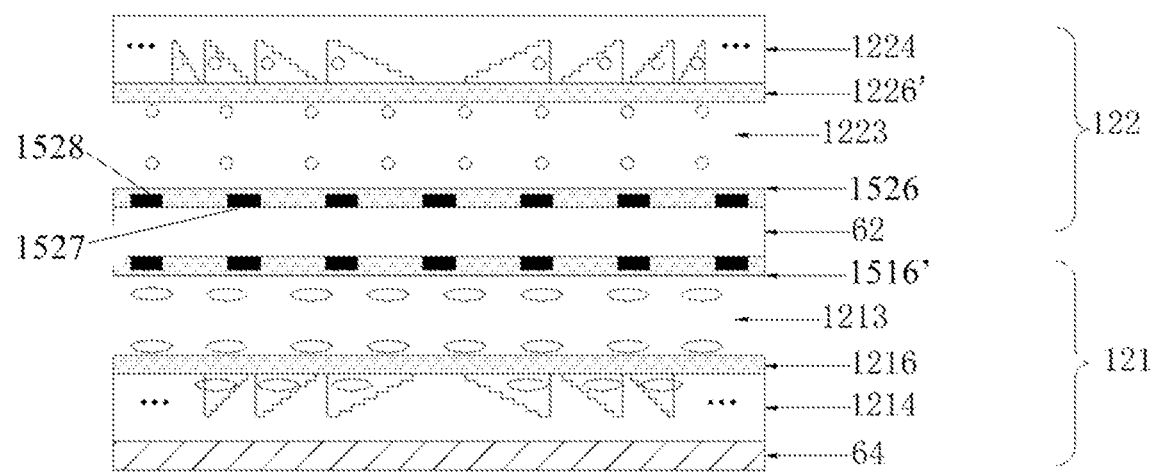
FIG. 15C shows a schematic diagram of a multifocal lens according to some embodiments of the present disclosure.

In some embodiments, similarly, when an appropriate voltage is applied to the pixel electrode 1527 and the COM electrode 1528 in the first transparent electrode, and no voltage is applied to the second transparent electrode, the liquid crystal molecules in the first liquid layer are driven by the horizontal electric field to form a deflection state as shown in FIG. 15C. As such, the long axes of the liquid crystal molecules in the first LC layer are parallel to the transmission axis of the polarizer, and the first liquid crystal layer has a high refractive index $n_e$ with respect to the incident polarized light. The long axes of the liquid crystal molecules in the second LC layer are perpendicular to the transmission axis of the polarizer, and the liquid crystal layer has a relatively low refractive index no with respect to the incident polarized light. The refractive indexes n of the first and second converging elements are designed to be the same as the high refractive index $n_e$ of the liquid crystal layer. Therefore, for the liquid crystal deflection state shown in FIG. 15C, the second switchable converging element of this state functions as a focus lens, and the first switchable converging element functions as a flat glass. As a whole, the multifocal lens has a focal length value of f2.

Similarly, in some embodiments, when no voltage is applied to the first and second transparent electrodes, the liquid crystal molecules in both the first and second LC layers are in an initial alignment state as shown in FIG. 15A, and the liquid crystal molecules in the first and second LC layers are both perpendicular to the transmission axis of the polarizer. The liquid crystals in both the first and second liquid crystal layers have a low refractive index $n_o$ with respect to incident polarized light. Therefore, for the liquid crystal state shown in FIG. 15A, the first and second switchable converging elements of this state both function as a focusing lens, and the structural device as a whole is a diffractive lens having a focal length value of f3'.

Thus, by selectively turning on the lens function of the liquid crystal cell, a plurality of diffractive lenses with switchable focal lengths can be obtained.

Figure 16A:
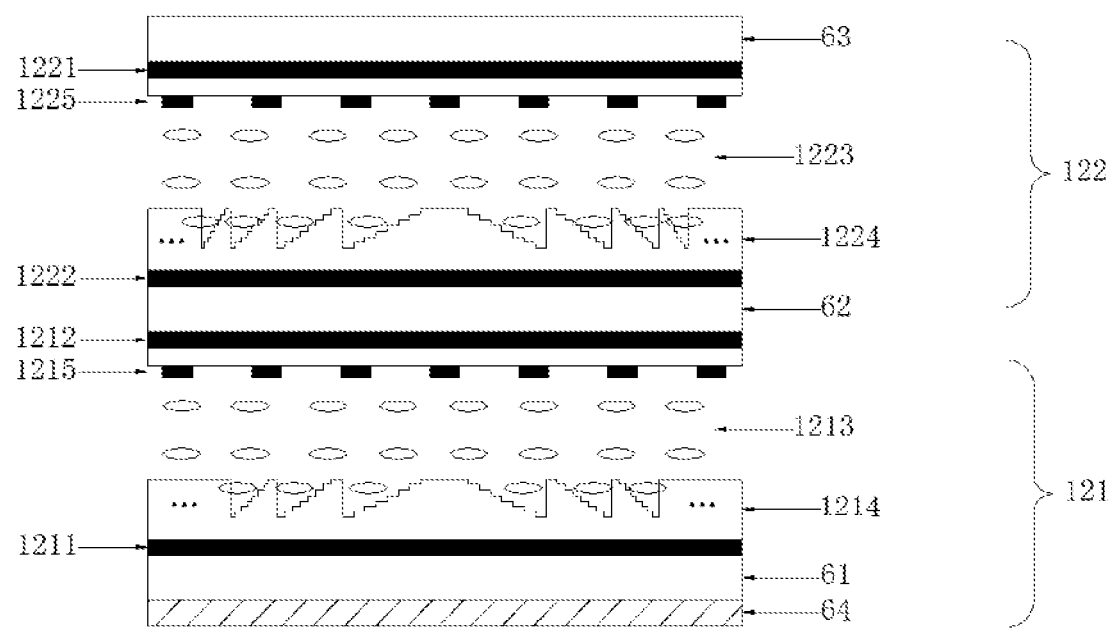
FIG. 16A shows a schematic diagram of a multifocal lens according to some embodiments of the present disclosure.
Figure 16B:
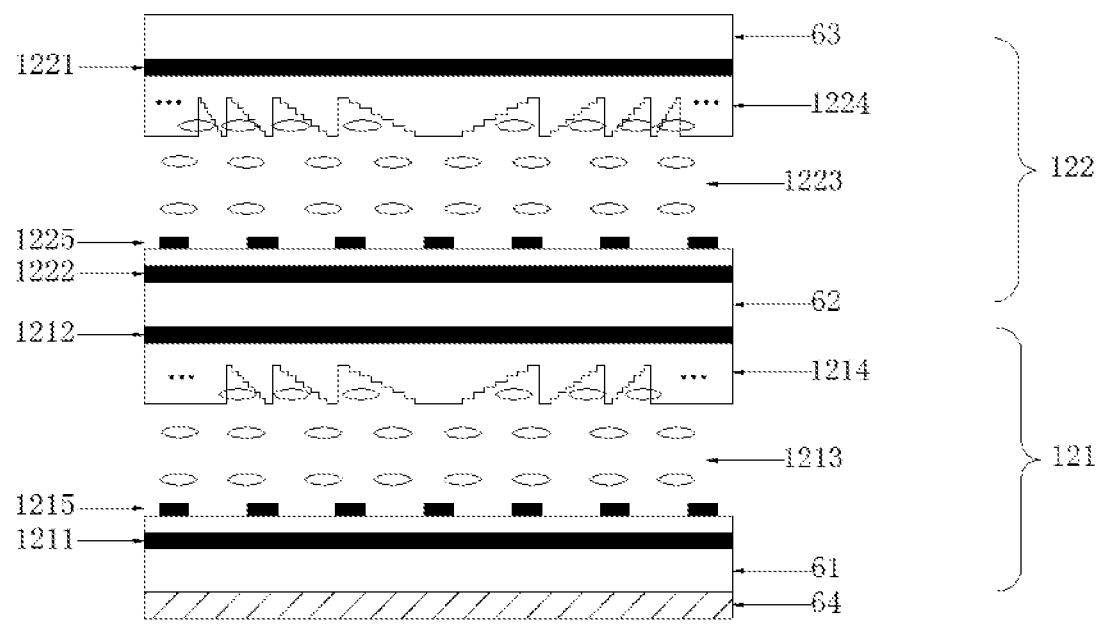
FIG. 16B shows a schematic diagram of a multifocal lens according to some embodiments of the present disclosure.
Figure 16C:
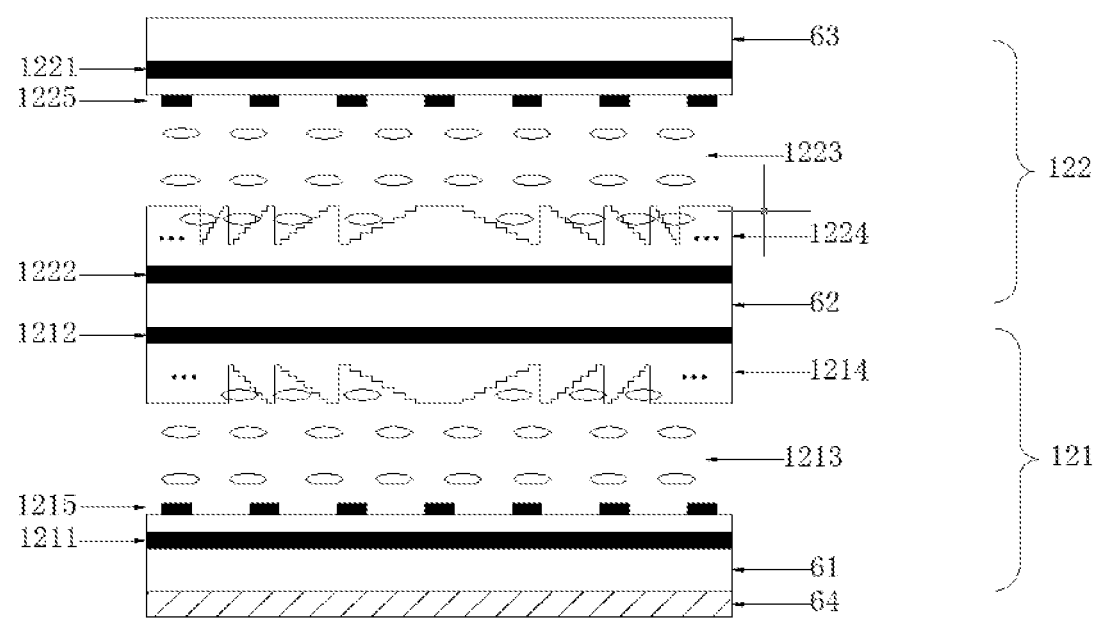
FIG. 16C shows a schematic diagram of a multifocal lens according to some embodiments of the present disclosure.

FIGS. 16A-C respectively show a schematic diagram of a multi-focal lens according to some embodiments of the present disclosure. In the embodiments, the locations of the converging elements are different. In one embodiment, as shown in FIG. 16A, the first converging element is between the first liquid crystal layer and the first base substrate. The second converging element is between the second liquid crystal layer and the second base substrate. In one embodiment, as shown in FIG. 16B, the first converging element is between the first liquid crystal layer and the second base substrate. The second converging element is between the second liquid crystal layer and the third base substrate. In one embodiment, as shown in FIG. 16C, the first converging element is between the first liquid crystal layer and the second base substrate. The second converging element is between the second liquid crystal layer and the second base substrate.

Figure 17:
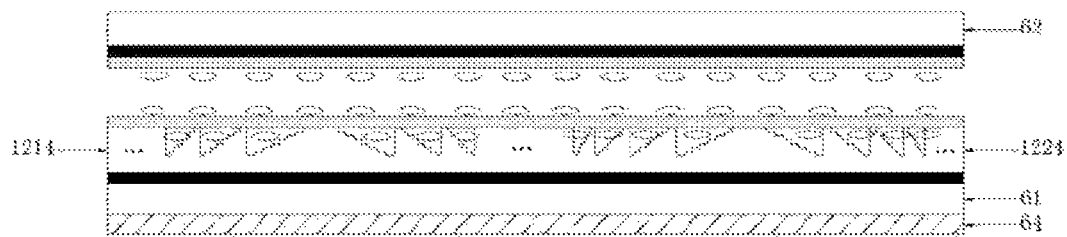
FIG. 17 shows a schematic diagram of a multifocal lens according to some embodiments of the present disclosure.

FIG. 17 shows a schematic diagram of a multi-focal lens according to some embodiments of the present disclosure. As shown in FIG. 17, the first and second liquid display panels are arranged side by side.

In some embodiments of the present disclosure, the converging elements 1214, 1224 of liquid crystal panels each may comprise an annular phase diffraction grating. In one embodiment, the annular phase diffraction grating may comprise a plurality of grating units arranged concentrically, and each grating unit may comprise $N=2^m$ steps, where m is an integer. It can be understood that the higher the number of steps each grating unit contains, the higher the diffraction efficiency.

Since the diffraction grating can have a small thickness, for example, on the order of nanometers, the use of the annular phase diffraction grating as the converging element in the multifocal lens can greatly reduce the thickness of the multifocal lens. As such, the thickness of the entire display apparatus can be reduced.

Figure 18:
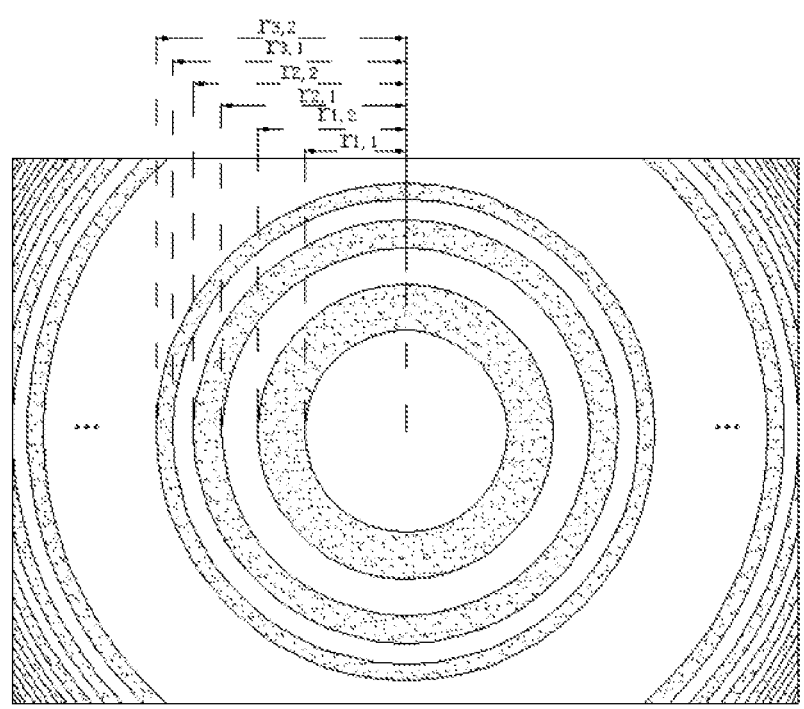
FIG. 18 is a schematic plan view of a two-step phase diffraction grating according to some embodiments of the present disclosure.
Figure 19:
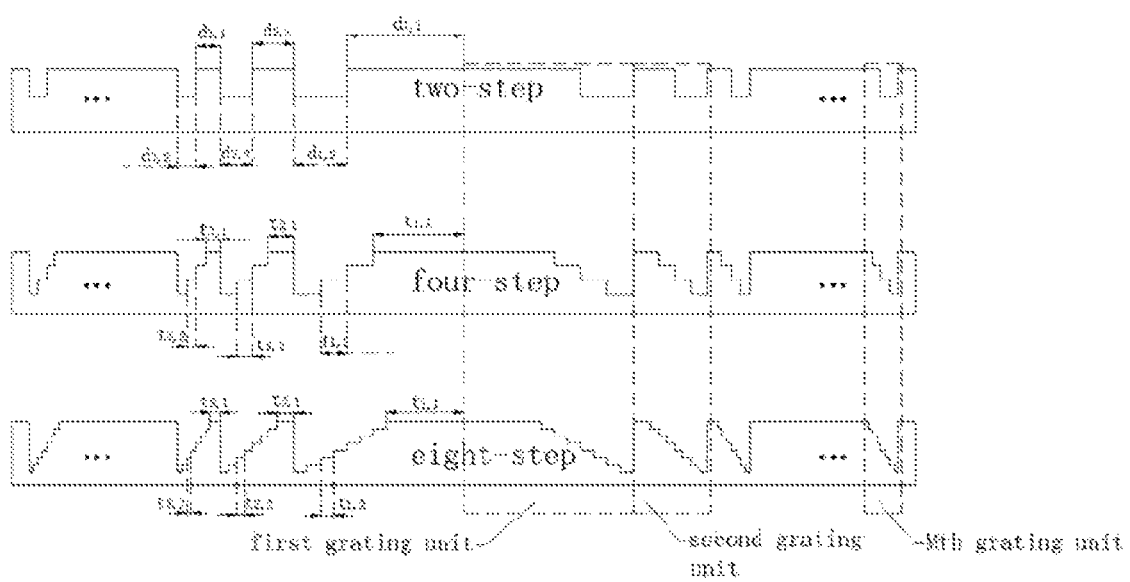
FIG. 19 is a schematic cross-sectional view of two-step, four-step, and eight-step phase diffraction gratings according to some embodiments of the present disclosure.

The parameter design of the annular phase diffraction grating of the first liquid crystal panel will be described in detail below with reference to FIGS. 18 and 19 according to some embodiments of the present disclosure. FIG. 18 is a schematic plan view showing a two-step phase diffraction grating in some embodiments of the present disclosure. FIG. 19 is a schematic illustration of cross-sectional views of two-step, four-step, and eight-step phase diffraction gratings in some embodiments of the present disclosure.

As shown in FIGS. 18 and 19, the annular phase diffraction grating includes grating units of from the first to the Mth, and M is a positive integer. Each grating unit includes $N=2^m$ steps, the phase difference of adjacent steps is $2\pi/N$, and the step height is $$h = \frac{\lambda/N}{n - n_o},$$

where $\lambda$ is a wavelength of the incident light (when the incident light is white light, that $\lambda=587$ nm is usually set), n is the refractive index of the converging element, and $n_o$ is the first refractive index.

For the two-step phase diffraction grating in FIG. 18, according to the properties of the diffraction grating, the two ring-band radii $r_{j,1}$, $r_{j,2}$ in the j-th grating unit satisfy the following relationship:

$$r_{j,1} = [(f_1' + (j-1)\lambda/2)^2 - f_1'^2]^{1/2} = \sqrt{(2j-1)f_1'\lambda}\left(1 + \frac{(2j-1)\lambda}{4f_1'}\right)^{1/2} \quad (10)$$

$$r_{j,2} = [(f_1' + j\lambda)^2 - f_1'^2]^{1/2} = \sqrt{2j\lambda f_1'}\left(1 + \frac{j\lambda}{2f_1'}\right)^{1/2} \quad (11)$$

Where j is a positive integer less than or equal to M, and f1' is the focal length of the annular phase diffraction grating of the first liquid crystal panel.

According to the formulas (10) and (11), the widths of the two steps of the j-th grating unit of the two-step phase diffraction grating are respectively:

$$d_{j,1} = r_{j,1} - r_{j-1,2} \quad (12)$$

$$d_{j,2} = r_{j,2} - r_{j,1} \quad (13)$$

For the N-step phase diffraction gratings, each of the grating units has N−1 steps of the same width, and the width of the remaining one step is different from the width of the above-described N−1 steps. The width of the N−1 steps having the same width in the jth grating unit is:

$$t_{j,2} = \frac{d_{j,2}}{N/2} \quad (14)$$

The width of the remaining step in the jth grating unit is:

$$t_{j,1} = d_{j,1} - \sum_{i=1}^{m-1} \frac{d_{j,2}}{2^i} \quad (15)$$

As an example, for an eight-step phase diffraction grating, according to equations (14) and (15), it can be concluded that the width of seven identical steps in the first grating unit is $$t_{1,2} = \frac{d_{1,2}}{4},$$

and the width of the remaining one step is $$t_{1,1} = d_{1,1} - \frac{d_{1,2}}{2} - \frac{d_{1,2}}{4}.$$

The width of the seven identical steps in the second grating unit is $$t_{2,2} = \frac{d_{2,2}}{4},$$

and the width of the remaining one step is $$t_{2,1} = d_{2,1} - \frac{d_{2,2}}{2} - \frac{d_{2,2}}{4}.$$

The width of the seven identical steps in the third grating unit is $$t_{3,2} = \frac{d_{3,2}}{4},$$

and the width of the remaining one step is $$t_{3,1} = d_{3,1} - \frac{d_{3,2}}{2} - \frac{d_{3,2}}{4}.$$

The parameter design process of the annular phase diffraction grating of the second liquid crystal panel may be similar to the design process of the first liquid crystal panel.

Figure 20:
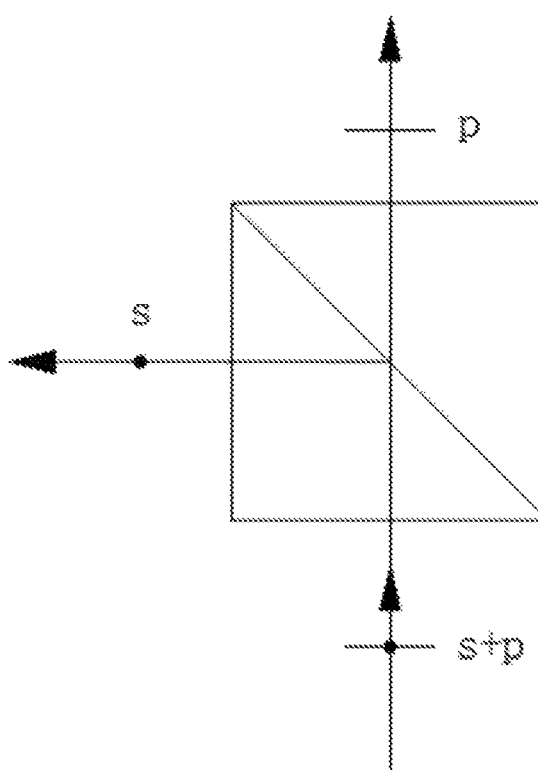
FIG. 20 illustrates the effect of a polarization beam splitting prism on the polarization state of incident light according to some embodiments of the disclosure.

In some embodiments, the light guiding structure can employ two polarization beam-splitting prisms. The polarization beam splitting prism can split the incident light into two linearly polarized lights whose polarization directions are perpendicular to each other. FIG. 20 illustrates the effect of a polarization beam splitting prism on the polarization state of incident light in some embodiments of the present disclosure. As shown in FIG. 20, the natural light incident on the multilayer optical film of the polarization beam splitting prism at Brewster's angle (for example, 45°) is reflected and refracted multiple times at the bonding interface of the two prisms, and decomposed into two lights, s light and p light whose polarization directions are perpendicular to each other. The s light whose polarization direction is perpendicular to the incident surface is reflected, and the p light whose polarization direction is parallel to the incident surface is completely transmitted.

In some embodiments of the present disclosure, in order to improve the utilization efficiency of the light, the direction of the transmission axis of the polarizer may be designed to be the polarization direction of the reflected lights of the first and second polarization beam splitting prisms, that is, the polarization direction of the s lights. With this configuration, the first polarization beam splitting prism and the second polarization beam splitting prism can guide the polarized light from the multifocal lens to the eyes of the user, thereby improving the light utilization efficiency.

In some embodiments, the display panel may be any type of display panel that may display an image, including, but not limited to, an LCD display panel, an LED display panel, and an OLED display panel.

In the case of using an LCD display panel, light emitted from the display panel is polarized light. In this case, the direction of the transmission axis of the polarizer of the multifocal lens can be set to be parallel to the polarization direction of the light emitted from the display panel. As such, all light emitted from the display panel can be incident onto the multifocal lens. Alternatively, the LCD display panel, the polarizer of the multifocal lens, and the first and second polarization beam splitting prisms may be designed so that the polarization direction of the light emitted from the LCD display panel is made the same as the direction of the transmission axis of the polarizer and the polarization direction of the reflected light of the polarization beam splitting prism to maximize the utilization of light.

Another example of the present disclosure provides a method for controlling a display apparatus. The method can be used to control a display apparatus having a multifocal lens such as that shown in FIG. 6, such that the multifocal lens in the display apparatus can be switched among at least three focal lengths. The control method can include at least one of the following steps: a1) generating a voltage difference between the first transparent electrode and the second transparent electrode of the first liquid crystal panel and generating no voltage difference between the first transparent electrode and the second transparent electrode of the second liquid crystal panel, thereby switching the multifocal lens to have a focal length of the first liquid crystal panel; b1) generating no voltage difference between the first transparent electrode and the second transparent electrode of the first liquid crystal panel and generating a voltage difference between the first transparent electrode and the second transparent electrode of the second liquid crystal panel, thereby switching the multifocal lens to have a focal length of the second liquid crystal panel; or c1) generating a voltage difference between the first transparent electrode and the second transparent electrode of the first liquid crystal panel and generating a voltage difference between the first transparent electrode and the second transparent electrode of the second liquid crystal panel, thereby switching the multifocal lens to have a focal length combined by the first liquid crystal panel and the second liquid crystal panel.

In some embodiments of the present disclosure, a method for controlling a display apparatus is also provided. The method can be used to control a display apparatus having a multifocal lens such as that shown in FIG. 10 such that the multifocal lens in the display apparatus can be switched among at least three focal lengths. The control method can include at least one of the following steps: a2) generating a voltage difference between the first transparent electrode and the second transparent electrode of the first liquid crystal panel and applying no voltage to the third transparent electrode of the first liquid crystal panel, and generating a voltage difference between the second transparent electrode and the third transparent electrode of the second liquid crystal panel and applying no voltage to the first transparent electrode of the second liquid crystal panel, thereby switching the multifocal lens to have a focal length of the first liquid crystal panel; b2) generating a voltage difference between the second transparent electrode and the third transparent electrode of the first liquid crystal panel and applying no voltage to the first transparent electrode of the first liquid crystal panel, and generating a voltage difference between the first transparent electrode and the second transparent electrode of the second liquid crystal panel and applying no voltage to the third transparent electrode of the second liquid crystal panel, thereby switching the multifocal lens to have a focal length of the second liquid crystal panel; or c2) generating a voltage difference between the first transparent electrode and the second transparent electrode of the first liquid crystal panel and applying no voltage to the third transparent electrode of the first liquid crystal panel, and generating a voltage difference between the first transparent electrode and the second transparent electrode of the second liquid crystal panel and applying no voltage to the third transparent electrode of the second liquid crystal panel, thereby switching the multifocal lens to have a focal length combined by the first liquid crystal panel and the second liquid crystal panel.

An element, unit or module described herein may be implemented as a combination of a processor and a memory, where the processor executes a program stored in the memory to implement the functionality of the respective element, unit or module. The elements, units or modules described herein may also be implemented in a complete hardware implementation, including an application specific integrated circuit (ASIC), field programmable gate array (FPGA), and the like.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A multifocal lens, comprising two liquid crystal panels on opposite sides of a substrate,
    wherein each of the two liquid crystal panels is a liquid crystal panel having a converging element with a focal length;
    the liquid crystal panel is configured to be switchable between a converging state and a non-converging state;
    the two liquid crystal panels are configured to make the multifocal lens to have switchable focal lengths, and the switchable focal lengths are different from one another;
    the multifocal lens includes a polarizer, a first converging element, a first liquid crystal layer, a first strip transparent electrode, the substrate, a second strip transparent electrode, and a second liquid crystal layer, and a second converging element;
    the first liquid crystal layer is disposed between the first converging element and the first strip transparent electrode, the second liquid crystal layer is disposed between the second converging element and the second strip transparent electrode, the substrate is disposed between the first strip transparent electrode and the second strip transparent electrode;
    the first strip transparent electrode and the second strip transparent electrodes are strip electrodes with a long side perpendicular to a transmission axis of the polarizer, each of the first liquid crystal layer and the second liquid crystal layer includes liquid crystal molecules, and an initial orientation direction of the liquid crystal molecules is oriented along a same direction of the long side of the strip electrodes; and
    each of the first strip transparent electrode and the second strip transparent electrode includes a pixel electrode and a common (COM) electrode in a same layer, the pixel electrode and the common electrode are configured to generate an electric field that aligns long axes of the liquid crystal molecules perpendicular to the transmission axis of the polarizer.

2. The multifocal lens according to claim 1, wherein the converging element comprises an annular phase diffraction grating.

3. A display apparatus, comprising:
    a display panel, and
    the multifocal lens according to claim 1 on a light exiting side of the display panel.

4. The display apparatus according to claim 1, wherein N is 2.

5. The display apparatus according to claim 3, further comprising a light guiding structure, which is configured to guide light emerging from the multifocal lens towards a user's eyes.

6. The display apparatus according to claim 5, wherein the light guiding structure comprises a first polarization beam splitting prism and a second polarization beam splitting prism,
    wherein the first polarization beam splitting prism is configured to reflect the light emerging from the multifocal lens to the second polarization beam splitting prism, and the second polarization beam splitting prism is configured to reflect the light from the first polarization beam splitting prism to the user's eyes.

7. The display apparatus according to claim 6, further comprising a polarizer on a side of the multifocal lens facing the display panel.

8. The display apparatus according to claim 7, wherein a direction of a transmission axis of the polarizer is parallel to polarization directions of the reflected light by the first polarization beam splitting prism and the second polarization beam splitting prism respectively.

9. The display apparatus according to claim 8, wherein light emitting from the display panel is a polarized light having a polarization direction parallel to a transmission axis of the polarizer.

10. The display apparatus according to claim 9, wherein the liquid crystals have an initial alignment direction parallel to the transmission axis of the polarizer.

11. The display apparatus according to claim 10, wherein the first liquid crystal layer and the second liquid crystal layer are configured to be switchable from one of a first refractive index and a second refractive index to the other based on voltages respectively applied to the first strip transparent electrode and the second strip transparent electrode, the first refractive index is smaller than a refractive index of the converging element of the liquid crystal panel liquid crystal panel, and the second refractive index is equal to the refractive index of the converging element of then liquid crystal panel.

12. The display apparatus according to claim 11, further comprising a control unit, wherein the control unit is configured to generate a voltage difference in one or more of N liquid crystal panels, thereby switching the multifocal lens to have switchable $C_N^1+C_N^2+C_N^3+\ldots+C_N^N$ focal lengths.

13. The display apparatus according to claim 5, wherein the light guiding structure comprises an in-coupling grating, a light guide plate, and an out-coupling grating,
wherein the in-coupling grating is configured to couple the light emerging from the multi-focal lens to the light guide plate, and the out-coupling grating is configured to couple the light out of the light guide plate.

14. The display apparatus according to claim 13, wherein the in-coupling grating and the multifocal lens are located at one end of the light guide plate, the light guide plate is between the in-coupling grating and the multifocal lens, the out-coupling grating is on the other end of the light guide plate and at a same side of the light guiding plate as the in-coupling grating.

15. The display apparatus according to claim 14, wherein grating constant d of the out-coupling grating satisfies:

$$d = \frac{2\lambda}{n'+1}$$

wherein n' is a refractive index of the light guide plate, and $\lambda$ is a wavelength of an incident light.

16. A display apparatus, comprising:
a display panel, and
the multifocal lens according to claim 1 on a light exiting side of the display panel.

17. The display apparatus according to claim 16, further comprising a control unit, wherein the control unit is configured to generate a voltage difference in the strip electrodes.

* * * * *